US010773168B2

(12) United States Patent
Rodgers

(10) Patent No.: US 10,773,168 B2
(45) Date of Patent: Sep. 15, 2020

(54) TEMPORARY GAME CONTROL BY USER SIMULATION FOLLOWING LOSS OF ACTIVE CONTROL

(71) Applicant: GOOGLE LLC, Mountain View, CA (US)

(72) Inventor: Matthew Rodgers, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/368,806

(22) Filed: Mar. 28, 2019

(65) Prior Publication Data

US 2019/0321727 A1 Oct. 24, 2019

Related U.S. Application Data

(60) Provisional application No. 62/651,665, filed on Apr. 2, 2018.

(51) Int. Cl.
| | | |
|---|---|---|
| A63F 13/493 | (2014.01) | |
| A63F 13/56 | (2014.01) | |
| A63F 13/335 | (2014.01) | |
| A63F 13/358 | (2014.01) | |
| A63F 13/497 | (2014.01) | |

(52) U.S. Cl.
CPC .......... *A63F 13/56* (2014.09); *A63F 13/335* (2014.09); *A63F 13/358* (2014.09); *A63F 13/493* (2014.09); *A63F 13/497* (2014.09)

(58) Field of Classification Search
CPC .... A63F 13/355; A63F 13/358; A63F 13/422; A63F 13/493; A63F 13/55; A63F 13/56; A63F 13/67; A63F 13/79; A63F 2300/208; A63F 2300/534; A63F 2300/6027; A63F 2300/6054
See application file for complete search history.

(56) References Cited

U.S. PATENT DOCUMENTS

| | | | |
|---|---|---|---|
| 6,855,058 B2 | 2/2005 | Kubota et al. | |
| 9,675,874 B1 | 6/2017 | Park | |
| 2006/0154710 A1* | 7/2006 | Serafat | A63F 13/86 463/1 |

(Continued)

OTHER PUBLICATIONS

Google LLC, International Search Report, PCT/US2019/025185, dated Jun. 18, 2019, 8 pgs.

*Primary Examiner* — Omkar A Deodhar
(74) *Attorney, Agent, or Firm* — Morgan, Lewis & Bockius LLP

(57) ABSTRACT

An electronic game server determines, during a disruption in a network connection between the server and a client device, a simulated gameplay input for the first client device; updates a first game state based on the simulated gameplay input, resulting in a placeholder game state; receives, upon resumption of the network connection, a recovered gameplay input initially transmitted by the first client device during the disruption; updates the first game state based on the recovered gameplay input, resulting in an intended game state; compares the placeholder game state to the intended game state; updates the placeholder game state based on the comparison of the placeholder game state to the intended game state, resulting in a subsequent game state; and transmits a frame depicting the subsequent game state to an output device associated with the first client device.

14 Claims, 10 Drawing Sheets

(56) References Cited

U.S. PATENT DOCUMENTS

2012/0270644 A1* 10/2012 Buhr .................... A63F 13/493
  463/29
2018/0256981 A1* 9/2018 Enomoto ................ A63F 13/67

* cited by examiner

TEMPORARY GAME CONTROL BY USER SIMULATION FOLLOWING LOSS OF ACTIVE CONTROL

RELATED APPLICATIONS

This application claims priority to U.S. Provisional Application No. 62/651,665, filed Apr. 2, 2018, which is hereby incorporated by reference in its entirety.

This application is related to U.S. Provisional Patent Application No. 62/655,688, filed Apr. 10, 2018; U.S. Provisional Patent Application No. 62/651,662, filed Apr. 2, 2018; U.S. Provisional Patent Application No. 62/651,542, filed Apr. 2, 2018; U.S. Provisional Patent Application No. 62/646,824, filed Mar. 22, 2018; U.S. patent application Ser. No. 15/851,610, filed Dec. 21, 2017; U.S. Provisional Patent Application No. 62/570,648, filed Oct. 10, 2017; and U.S. patent application Ser. No. 15/599,408, filed May 18, 2017, which claims priority to U.S. Provisional Patent Application No. 62/339,052, filed May 19, 2016; each of which is incorporated by reference herein in its entirety.

TECHNICAL FIELD

This application relates generally to computer technology, including but not limited to methods and systems for managing a server system to support online interactive sessions corresponding to one or more real time user-interactive applications.

BACKGROUND

Internet-connected electronic devices can support a variety of cloud-based media and entertainment applications. These applications include media streaming applications in which a server streams content to user devices, gaming applications in which a user interacts from a user device with a game that executes on a server, and a variety of social media and communication applications that allow large numbers of users to interact concurrently with each other and with cloud-hosted content and applications via their Internet-connected devices. Among cloud-based applications, cloud gaming presents some unique challenges due to: the widely varying hardware demands of gaming titles; the diverse topologies in which cloud-based games can be played (e.g., by a single player, by multiple players in a single location, or by multiple players in multiple locations); the need to transmit reliably and without latency player inputs to a gaming server that executes a gaming session and gaming session outputs from the gaming server to the players' devices/displays; widely varying player expectations as to speed and responsiveness of gameplay; and the desire in some situations to provide near-real time gaming content to spectators. Other challenges of cloud based gaming relate to providing a consistent gameplay experience for players regardless of where they are located (e.g., close or far from the server), how they connect to the gaming service (e.g., via a fast or slow Internet connection), and what type of device(s) they use to play the game (e.g., a generic personal device or a dedicated game controller) and view gameplay outputs (e.g., a personal device or a media device connected to a media streaming device).

Specifically, there is a need for a cloud gaming system that supports multiple gaming sessions for multiple gaming titles, where the games can execute concurrently with acceptable latency and responsiveness, including for multiple players who are playing the same game title from the same or different locations, with a wide variety of input and output devices and network connections. In addition, there is a need for a cloud gaming system that, upon receiving a player input (e.g., a gaming input entered on an end user gaming device/controller) in a gaming session, processes the user input promptly and outputs high-definition images reflecting the outcome of the player input action for all of the game players simultaneously and with acceptable latency. There is also a need for a gaming system that, in some situations, provides a high definition video stream of gameplay activity to allow spectators to follow the gameplay in real time on the respective display devices. As such, it would be beneficial to provide a cloud gaming system with efficient game processing and output mechanisms to expand the gaming experience in a wide range of gaming settings, from spontaneous gameplay by users gathered in the same location to online interactive gameplay by multiple users from different locations.

SUMMARY

Implementations described in this specification are directed to providing a gaming application programming interface (API) and cloud platform to enable efficient, portable, and low latency hosting of third party gaming content. Some implementations dynamically allocate cloud gaming hardware resources, and monitor and utilize network bandwidth available to individual end users to provide an optimal cloud gaming experience. Some implementations provide multiple performance tiers, including a tier that supports high performance, real-time gaming sessions with high definition media output and end user streams. Some implementations support different subscription models and/or are configured to provide one or more concurrent real-time gameplay and/or review media streams that correspond with little or no latency to one or more actual gaming streams (e.g., a video stream output to a client device of a user participating in an online/cloud gaming session via either a mobile app or a browser-based program). In some implementations, concurrent gameplay and/or review videos are provided with little or no latency via a media streaming site, such as YouTube, to one or more users.

In one aspect of the application, a method of processing gameplay inputs during and after network disruptions is implemented at a server system having one or more processors and memory storing one or more programs for execution by the one or more processors. The method includes determining, during a disruption in a network connection between the server system and a first client device, a simulated gameplay input for the first client device; updating a first game state based on the simulated gameplay input, resulting in a placeholder game state; receiving, upon resumption of the network connection, a recovered gameplay input made by a user of the first client device during the disruption; updating the first game state based on the recovered gameplay input, resulting in an intended game state; comparing the placeholder game state to the intended game state; updating the placeholder game state based on the comparison of the placeholder game state to the intended game state, resulting in a subsequent game state; and transmitting a frame depicting the subsequent game state to an output device associated with the first client device.

In accordance with some aspects of this application, a server system includes memory storing instructions for causing the server system to perform any of the methods described above.

Further, in accordance with some aspects of this application, instructions stored in memory of a server system include instructions for causing the server system to perform any of the methods described above.

Other embodiments and advantages may be apparent to those skilled in the art in light of the descriptions and drawings in this specification.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the drawings.

DESCRIPTION OF IMPLEMENTATIONS

Figure 1:
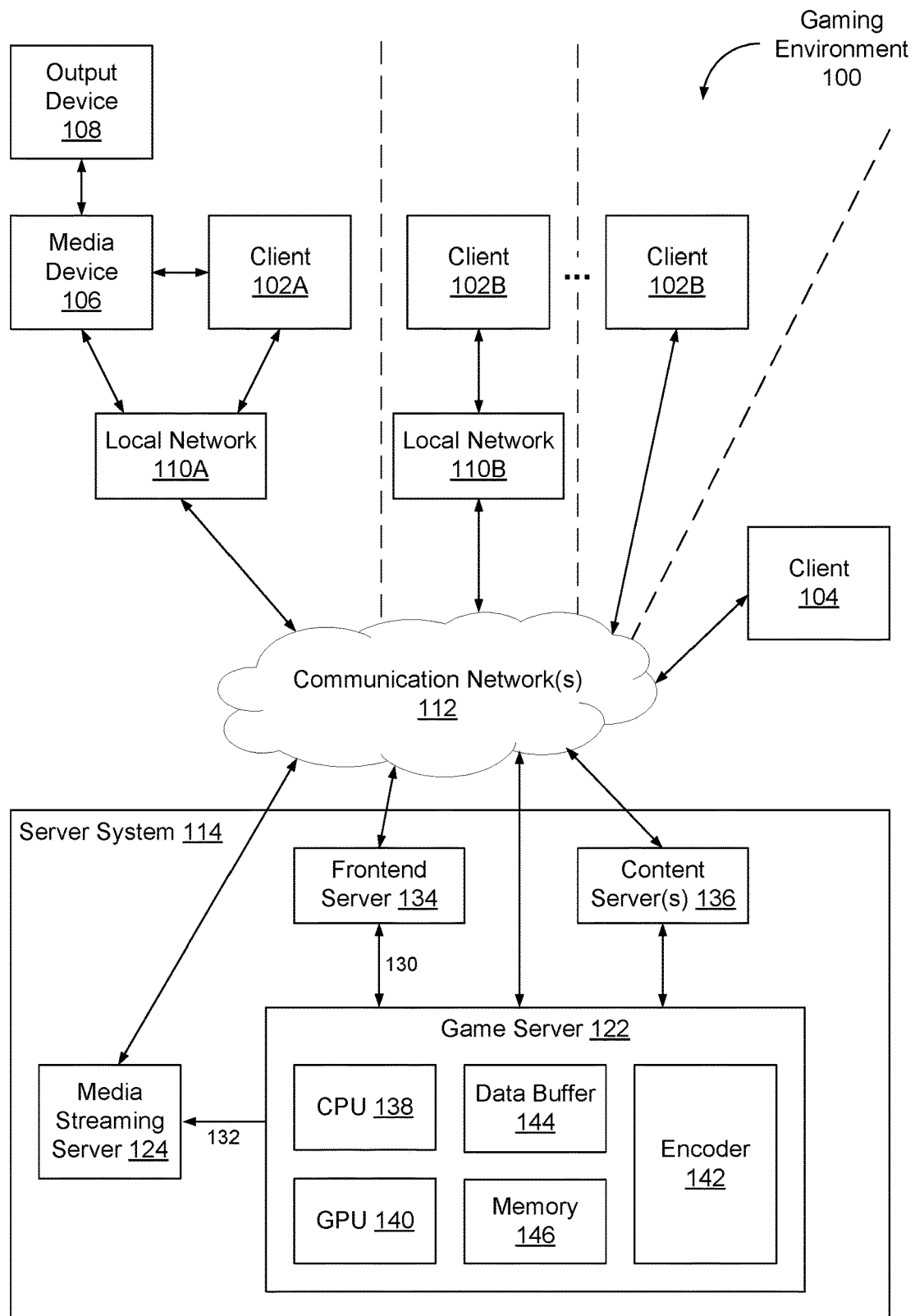
FIG. 1 is an example online interactive gaming environment in accordance with some implementations.

Implementations described in this specification are directed to providing a cloud platform and an API to enable efficient, portable, low latency hosting of cloud gaming content, including third party gaming content. Some implementations dynamically allocate cloud gaming hardware resources (e.g., CPUs, GPUs, memory, input/output, and video stream encoders) and monitor and utilize network bandwidth available to individual end users to provide an optimal online gaming experience concurrently to a community of game players. Some implementations provide multiple performance tiers, including a tier that supports high performance, real-time gaming sessions with high definition media streams for end users. Some implementations support different subscription models and/or are configured to provide one or more concurrent real time gameplay and/or review media streams that correspond with little or no latency to one or more actual gaming streams (e.g., a video stream output to a client device of a user participating in an online/cloud gaming session via either a mobile application or a browser-based program). In some implementations, the real-time gameplay and/or review media streams are provided with little or no latency via a media streaming site, such as YouTube, to one or more users.

In some implementations of a cloud gaming environment, a server system provides hardware resources for a real-time, interactive gaming session for processing player inputs and generating output streams for display to one or more players and, optionally, gaming spectators. In response to a request to establish the real-time interactive gaming session, the server system determines a device capability (e.g., hardware and/or software capabilities) of the requesting client device (i.e., the player's controller device), a connection capability (e.g., bandwidth, latency and/or error rate) of a network connection, and one or more target quality parameters of the gaming session (e.g., resolution of the output video stream(s), gaming response latency, etc.), and accordingly, associates one of its virtual machines with the real-time interactive session for establishing the session.

In some implementations, processing and encoding capability of gaming data (e.g., to produce output video streams for players and/or spectators) are managed for one or more processing cores (e.g., GPU cores and encoder cores) in the server system that hosts the real-time, online, and interactive gaming environment. For example, in some implementations, the one or more processing cores operate with a plurality of processing slices (e.g., each executing on a core for 16.67 ms), and the server system allocates each of the plurality of processing slices to a subset of a plurality of online gaming sessions to be executed thereon. For one of the processing slices, the server system determines a time-sharing processing schedule, such that a corresponding subset of gaming sessions share a duty cycle of the processing slice, and are executed in parallel according to their respective real-time data processing need. Additionally, to expedite image encoding within a time interval, an encoder of the server system does not need to wait until a GPU has made available all data of an image frame. Rather, in some implementations, a portion of an image frame is encoded as soon as information required for encoding the portion is provided by the GPU, independently of whether other portions of the image frame that are irrelevant to the encoded portion are made available or not by the GPU.

In addition, the server system can dynamically generate a number of frames in response to a user command received from a user who plays an online gaming session. In accordance with a type of the user command, the server system determines an expected response latency, actual communication and processing latencies, and an actual transmission latency. Then, the user command is executed in the online gaming session by generating a set of frames reflecting an effect of the command. The set of frames when transmitted at a predefined frame rate occupy a transmission time corresponding to the actual transmission latency, and can be received at a client device of the user within a time corresponding to the expected response latency.

FIG. 1 is an example online interactive gaming environment 100 in accordance with some implementations. The online interactive gaming environment 100 includes one or more client devices (e.g., client devices 102 and 104). Each of the client devices 102 executes one or more game applications. A game session can be run on a specific game application to allow a user of the client device 102 to play an online interactive game hosted by a server system 114. In some implementations, the client device 102 (e.g., a host client) is configured to invite one or more other client devices 102 to join a game scene of the specific game application. Gaming sessions of these client devices 102 are synchronized to display the same game scene, optionally with distinct perspectives corresponding to their respective users.

Conversely, the server system 114 hosts an online interactive game platform to support the client devices 102 to play the one or more game applications including the specific game application. Specifically, the server system 114 includes a plurality of user accounts associated with the client devices 102, and authenticates the users of the client devices in association with each of the one or more game applications. The server system 114 renders and refreshes a scene of the online interactive game on the client devices 102 that join corresponding gaming sessions associated with the scene. In some implementations, the server system 114 assesses the capabilities of the client devices 102 and/or a quality of the communicative connection between the server system 114 and each of the client devices 102, and adaptively generates synchronous data streams for the gaming sessions associated with the client devices 102. By these means, the server system 114 is configured to facilitate synchronous gaming sessions of an online interactive game on two or more client devices 102 simultaneously and with substantially low latencies.

In some implementations, the server system 114 includes a game server 122 and a media streaming server 124. The game server 122 is configured to provide two or more media streams concurrently for an online interactive game session running on a first client device 102A. The two or more media streams include a low latency stream and a normal latency stream that are provided to the first client device 102A and a reviewer client device 104 via one or more communication network 112, respectively. Optionally, the normal latency stream is provided for instructional purposes. While a user of the first client device 102 plays the game session on the first client device 102A, the game session is recorded and broadcast to one or more spectators via the normal latency stream, i.e., the spectators can review the game session on the reviewer client device 104. The low latency stream corresponds to gameplay of the online interactive game session, and has a faster response rate and lower transmission latency than the normal latency stream that corresponds to an associated review session. For example, the low latency stream has a predefined frame rate of 60 frames per second (fps), and provides at least one frame to the first client device 102A during each time interval of 16.67 ms, and the normal latency stream has a predefined frame rate of 30 fps, and provides at least one frame to the reviewer client device 104 during each time interval of 33.33 ms. In some implementations, the normal latency stream has a lower resolution than that of the low latency stream.

In some implementations, a client device 102 or 104 has a display screen integrated therein for displaying media content. In some implementations, a client device 102 or 104 is coupled to a media device 106 and an output device 108. Specifically, the client device 102 or 104 can be communicatively coupled to the media device 106 directly (e.g., via Bluetooth or other wireless communication links), via a local network 110 (e.g., a Wi-Fi network), or via one or more communication networks 112. In some implementations, the client device (102 or 104) and the media device 106 are local to each other (e.g., in the same room, in the same house, etc.). The media device 106 is further coupled to one or more output devices 108 that can output visual and/or audio content (e.g., a television, a display monitor, a sound system, speakers, etc.). The media device 106 is configured to output content to the output device(s) 108. In some implementations, the media device 106 is a casting device (e.g., CHROMECAST by Google Inc.) or a device that otherwise includes casting functionality.

In some implementations, one or more client devices 102 or 104 are capable of data communication and information sharing with each other, a central server or cloud-computing system (e.g., the server system 114), and/or other devices (e.g., another client device 102 or 104, a media device 106 and an output device 108) that are network-connected. Data communication may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document. In some embodiments, the online interactive gaming environment 100 includes a conventional network device (e.g., a router) via which a set of client devices 102 and 104 and their corresponding media and output devices (if any) are communicatively coupled to each other on a local network 110 (e.g., a local area network), and the local network 110 is communicatively coupled to communication networks 112 (e.g., wide-area networks and the Internet). In some embodiments, each of the client devices 102 and 104 optionally communicates with one or more other client devices, a respective media device 106, or a respective output device 108 using one or more radio communication networks (e.g., ZigBee, Z-Wave, Insteon, Bluetooth, Wi-Fi, and/or other radio communication networks).

In some implementations, the client devices 102 are remote from each other, i.e., they are not located in the same room or even structure. A game may be started by launching a game application (e.g., game application 228, FIG. 2) for execution at each client device 102. In some implementations, for each client device 102, the game application establishes an online gaming session 116 with the server system 114 independently. The online gaming sessions 116 of two or more client devices 102 (e.g., 102A and 102B) are related to each other (e.g., because they are played in the same game domain of the game application), and therefore, share a game scene in the game application. The related online gaming sessions 116 are synchronized with each other, and each online gaming session 116 optionally shows the same game scene with a unique player perspective corresponding to the respective client device 102. A user of each client device 102 can therefore play the game on the respective client device and influence the output from the online gaming sessions 116 on the other client device(s) 102.

Alternatively, in some other implementations, after the game application of a first client device 102A establishes an online gaming session 116, one or more second client devices 102B are invited to join the online gaming session 116 by an invitation message, and for example, a message with the link (e.g., a URL address) to join the online gaming session 116 is sent to each of the second client devices 102B. An appropriate controller configuration is provided to each second client device 102B that is invited to join the online gaming session 116. In this application, when the second clients 102B join an online gaming session 116, the server system 114 creates a separate gaming session 116 for each individual second client device 102B. Each separate gaming session 116 of the respective second client device 102B is synchronized with and shares the same scene with the gaming session 116 of the first client device 102A, but can have a unique player perspective corresponding to the respective second client device 102B. After each second client device 102B has received the appropriate controller configuration and joined the online gaming session 116 (more accurately, started its related online gaming session 116), a user can play the game on the respective second client device 102B and influence the output of the online gaming sessions 116 running on the other client device(s) 102.

The client device 102 is a device that includes, and can run, one or more distinct user applications including the game application. In some implementations, the client device 102 is a smartphone, a tablet device, a laptop computer, a desktop computer, or a multimedia device. In some implementations, the client device 102 is a dedicated game controller including game controls (e.g., one or more buttons, joysticks, touch-screen affordances, motion controls, pressure controls, vision controls, audio controls, and/or other haptic interfaces) configured to control certain aspects of gameplay when activated or otherwise manipulated. In some implementations, the client device 102 includes one or more user applications that are configured to operate in conjunction with the media device 106. In some implementations, the applications include a media device application for pairing the client device 102 with the media device 106 and configuring the media device 106. The applications also include one or more applications that can cast associated content to the media device 106. In some implementations, an application casts data and/or content to the media device 106 by sending the data/content directly to the media device 106 (e.g., via the local network) and/or by directing the media device 106 to a remote location (e.g., a URL or other link to a location at a server system) from which the media device 106 can stream or otherwise receive data/content. The media device 106 receives data/content from the application and/or the remote location and outputs visual and/or audio content corresponding to the received data/content to the output device 108. Thus, an online gaming session 116 is established between the game application running on the client device 102, the remote server system 114, and the media device 106.

In some implementations, as part of the process of linking related online game sessions 116, the server system 114 assesses the capabilities of each corresponding client device 102 and/or a quality of the communicative connection between the server system 114 and the client device 102. In some implementations, the server system 114 measures network latency between the client device 102 and the server system 114. If the measured latency is above a threshold and a lower-latency connection is available, the server system 114 can suggest that the client device 102 change to the lower latency connection, or invite a user of the client device 102 to change the client device 102 to the lower latency connection. For example, if the client device 102 is on a cellular wireless connection 118, and a local network is available, the server system 114 can suggest that the client device 102 should connect through the available local network. In some implementations, the latency threshold requirements differ between games. For example, some games (e.g., action games) are best experienced on lower latency connections, and some other games (e.g., online board games or card games) are not as demanding with respect to latency. The server system 114 may make connection recommendations in view of these different requirements associated with different types of games.

In some implementations, as part of the client device 102 starting or joining the gaming session 116, the server system 114 communicates with the client device 102 to set up a controller (e.g., a gaming controller configuration and/or interface) on the client device 102. In some implementations, this includes the server system 114 assessing whether the client device 102 has the needed resources and communication capability for the controller. Depending on available resources at the client device 102, connection quality, and requirements for the game, the controller may be implemented differently at the client device 102. In some implementations, a game can be played with a webpage-based controller interface. For example, a controller interface for the game may be embedded in a webpage, and the webpage is rendered in a web browser on the client device 102. Alternatively, in some implementations, a standardized controller is implemented in a predefined application not specific to the game or directly associated with the game (e.g., a casting device application, such as CHROMECAST or GOOGLE CAST by Google Inc., or other media device application), or in the operating system of the client device 102. For example, the device operating system or a predefined application on the client device 102 may have a controller sub-module. The controller sub-module includes one or more standardized controller configurations, templates, or the like. Each of the standardized controller configurations configures the controller sub-module to utilize input devices and/or sensors on the client device 102 in some way to implement a virtual controller. The standardized controller configuration is used may vary with the game and/or with the type of client device.

Further, in some implementations, a game has a specific controller configuration that may be implemented on the controller sub-module. Such a configuration may be stored at the server system 114 and transmitted to the client devices 102, as part of the process of the client devices 102 joining or starting the online gaming session 116. In some implementations, a specific controller configuration can be an entirely custom controller or a mix of standard controller and a custom controller. Additionally, in some implementations, a game requires a specific application associated with the game. For example, a game may require a controller application associated specifically with the game. In some implementations, the client device 102 may be directed to download the specific application or the predefined application as part of starting or joining the session 116. For example, if the client device 102 does not already have the predefined application (with the controller sub-module) or the specific application associated with game, and such an application is required for play, the server system 114 instructs the client device 102 to prompt its user that a download is needed and to ask the user for permission to proceed.

In some implementations, the server system 114 stores user information associated with user accounts of each of one or more game applications (e.g., game application 228, FIG. 2) that are hosted on the server system 114. Examples of the user information include, but are not limited to, user account information (e.g., identification and passwords), membership type, preference, and activity history. In some implementations, the server system 114 stores session data associated with the online gaming sessions that are played on the client devices 102. Examples of the session data for each online gaming session 116 include, but are not limited to, a frame rate, a rendering specification, a normal latency requirement, information of GPU allocation, information of encoder allocation, identifications of related sessions, and latest status information.

In some implementations, the server system 114 provides a gaming API and cloud platform to enable efficient, portable, low latency hosting of third party gaming content used in the online gaming session 116. In some implementations, the gaming API and cloud platform are enabled by a server system 114 that further includes one or more of: a frontend server 134, a media streaming server 124, a game server 122, and one or more third party content servers 136. In some implementations, the gaming API platform is created by and/or hosted by the game server 122 and enables the gaming session 116 in conjunction with a frontend server 134 and content server(s) 136. The frontend server 134 is configured to provide service to a user of the gaming session 116, and to manage accounts for users. Optionally, users subscribe to a gaming service via the frontend server 134. The content servers 136 provide gaming content related to the gaming session 116.

In some implementations, the frontend server 134 manages user accounts associated with the client devices 102 and 104, e.g., subscriptions to membership of one or more online interactive games by a user account. After the client devices 102 log onto their respective user accounts and join their online gaming sessions 116, the game server 122 sets up the game sessions 116, and manages each specific gaming session 116 for a respective client device 102 by obtaining game contents from the content servers 136, sending the game contents to the game applications executed on the client devices 102, identifying user requests or actions, rendering gameplay outputs for the client devices 102 in response to the user requests or actions, and storing game state data during the respective gaming session 116. The game server 122 includes one or more processing units (e.g., CPU(s) 138, GPU(s) 140 and encoder 142), memory 146, and a data buffer 144 that temporarily stores multimedia content generated by the GPU 140 and provides the multimedia content to the encoder 142 for further encoding (e.g., standardization or compression). The data buffer 144 is optionally integrated in or independent of the memory 146.

In some implementations, the game server 122 dynamically allocates cloud gaming hardware resources (e.g., GPU 140 and encoder 142) and monitors and utilizes network bandwidth available to individual end users to provide an optimal cloud gaming experience. In some implementations, the game server 122 provides multiple performance tiers, including a tier that supports high performance, real-time gaming sessions with high definition video/media streams. In some implementations, the game server 122 supports different subscription models and/or are configured to provide one or more concurrent real-time gameplay and/or review media streams that correspond with little or no latency to one or more actual gaming streams (e.g., a video stream output to a client device of a user participating in an online/cloud gaming session via either a mobile app or a browser-based program). Specifically, the game server 122 is configured to generate concurrent media streams for gameplay and review videos, and the media streaming server 104 is provided with review videos for concurrent gameplay. Such review videos are provided with little or no latency via a media streaming site, such as YouTube, to one or more users. The media streaming site is optionally managed by the media streaming server 124.

Some implementations enable the hosting of public events in conjunction with gaming competitions. For example, in conjunction with a multi-player gaming event or competition based on a hosted game, a cloud gaming site that is hosted by the game server 122 can broadcast or stream to specific reviewer client devices 104, optionally via the media streaming server 123: (a) one or more concurrent ancillary or supplemental media streams, including associated commentary tracks/streams, (b) gaming streams from different competitor points of view, a highlights stream showing particularly compelling gaming action based on cloud server analysis and/or scoring of multiple gaming sessions associated with the gaming event, (c) one or more game point of view streams reflecting gameplay sessions 116 of one or more active gamers, and/or (d) instructional tracks from one or more active gamers and/or commentators, possibly including real-time picture-in-picture (PIP) video sent by the active gamers to the cloud gaming server system 114 along with their corresponding gameplay responses.

In accordance with some implementations, examples of third party content that can be effectively hosted by the content servers 136 include, without limitation, sports games, racing games, role playing games (RPG) and first person shooter (FPS) games. Different instances of these games may have widely varying cloud hardware requirements and network (e.g., to ensure an optimal user gaming experience—consistent in some instances with different subscription performance tiers) based on different associated latency requirements and expectations, output video resolution, and gaming server computational workload and video encoding/streaming resources, and network bandwidth.

In some implementations, the frontend server 134 provides account management APIs and/or software modules that monitor gameplay activity and related requests of subscribers (e.g., requests by end users to invite other players to participate in a gaming session, upgrade their in-game tools, and/or gaming performance) and transmit or make available by APIs associated information to the third party content servers 136 to enable content providers to track settings (including but not limited to billing information, in-game credits, subscription level, etc.) of their subscribers and/or followers. In some implementations, a content provider of hosted content can provide via the same hosting platform one or more different subscription models for the hosted content. In some implementations, a user (e.g., a subscriber to a gaming service) is granted unlimited access and gameplay to all games offered by the content provider on the hosting platform. In some implementations, a user is granted unlimited access and gameplay to one or more specific gaming franchises (e.g., a specific football or first person shooter franchise) offered by the content provider on the hosting platform. In some implementations, the subscriptions are for limited participation by a user—where the participation can be limited based on gameplay time, level of hardware resources committed to the end user, or end user device type/location. In some implementations, the account APIs and modules configure and monitor gameplay sessions, and enable the content providers to track gaming activity of respective subscribers in accordance with their most current subscription information—even during active gameplay.

The server system 114 enables cloud features that allow a user to move around, e.g., suspending a first game stream of a first gaming session executed on a first client device 102, and restarting the first game stream on a second gaming session of a second client device 102 to continue the first game session. The server system 114 also supports multiple players on a massive scale, and provides richer, more persistent cloud-based worlds. The server system 114 uses a cloud-based system to store session data related to different gaming sessions 116 of the same user, or different gaming sessions 116 of different users.

The server system 114 renders gaming content on a plurality of client devices 102 and 104, including but not limited to, mobile phones, tablet computers, desktop computers, and televisions. Optionally, the gaming content is dynamically adjusted to comply with the specifications of these client devices 102 and 104. In some implementations, the client devices 102 and 104 have a limited or no storage capability, because the gaming API platform provides instant access and requires no or little user device storage (e.g., a user can start playing in 5 seconds and save 250 GB of console hard drive space).

In addition to gaming content, the server system 114 also streams to the client devices 102 and 104 add-on content, e.g., new league rosters, statistics, and preview access to early titles, which is optionally updated regularly (e.g., readily updated, upgraded every day or every hour). In some implementations, the add-on content includes a search result of an internet search or a database search.

In some implementations, the server system 114 supports a live online community associated with a game application. Users (e.g., subscribers of a service) participate in live events, tournaments or activities on the corresponding gaming API platform throughout the day. Examples of the live events, tournaments or activities include spectating live gaming sessions played by other users, posting accomplishments to a public domain (e.g., YouTube), and getting live tips and coaching videos. For example, in response to a user action, the game server 122 provides two or more live streams 130 and 132. While keeping a first gaming stream 130 on a first gaming session 116 of the first client device 102A for a game player, the server system 114 also broadcasts a second live review stream 132 (e.g., YouTube streams) to one or more other client devices 104 (e.g., of subscribers). The second live review stream 132 allows the user to share his or her gaming experience with an audience. Optionally, the second live stream is a reproduction of a screen of the first client device 102A of the player. The server system 114 may obtain an audio stream in which the player explains the first gaming session 116, or a video stream of the player playing and explaining the first gaming session 116. The audio stream is optionally played for the audience while the second live review stream 132 is played for the audience. The video stream is optionally played in an embedded window in the second live review stream 132.

Some implementations provide on-the-go gaming, allowing the user to take—to any location or client device—his or her desired games. For example, a user can start an online gaming session 116 on a mobile device 102A on his or her commute, then seamlessly resume the gaming session 116 at his or her destination on a laptop computer 102B. Also, in some implementations, based on the different client device resources available to a user as the gaming session 116 is handed off between different devices 102, the server system 114 (specifically, the game server 122) can dynamically deploy a different set of hardware resources (e.g., GPU 140 and encoder 142) to optimize the user's gaming experience based on the different end user current device resources (e.g., client hardware capability and network bandwidth).

In the server system 114, the frontend server 134 and the game server 122 can have a respective user account system. In an example, the user account system for the frontend server 134 is used to manage subscriptions to specific gaming content and service, and the user account system for the game server 122 (e.g., a YouTube or Google account) is used for managing gaming experience (e.g., rendering gaming content to satisfy specific gaming criteria) and many other purposes. In some implementations, these two user account systems share customer and usage data (e.g., social, friends, presence, authentication, account information, billing information). Also, the content frontend server 134 provides a service layer that sits on top of a technology layer enabled by the game server 122. In some implementations, gaming content server(s) manage additional user account systems for accessing their content. Optionally, the additional user account systems for gaming content are integrated with the user account system for the frontend server 134 that manages user subscriptions.

Figure 2:
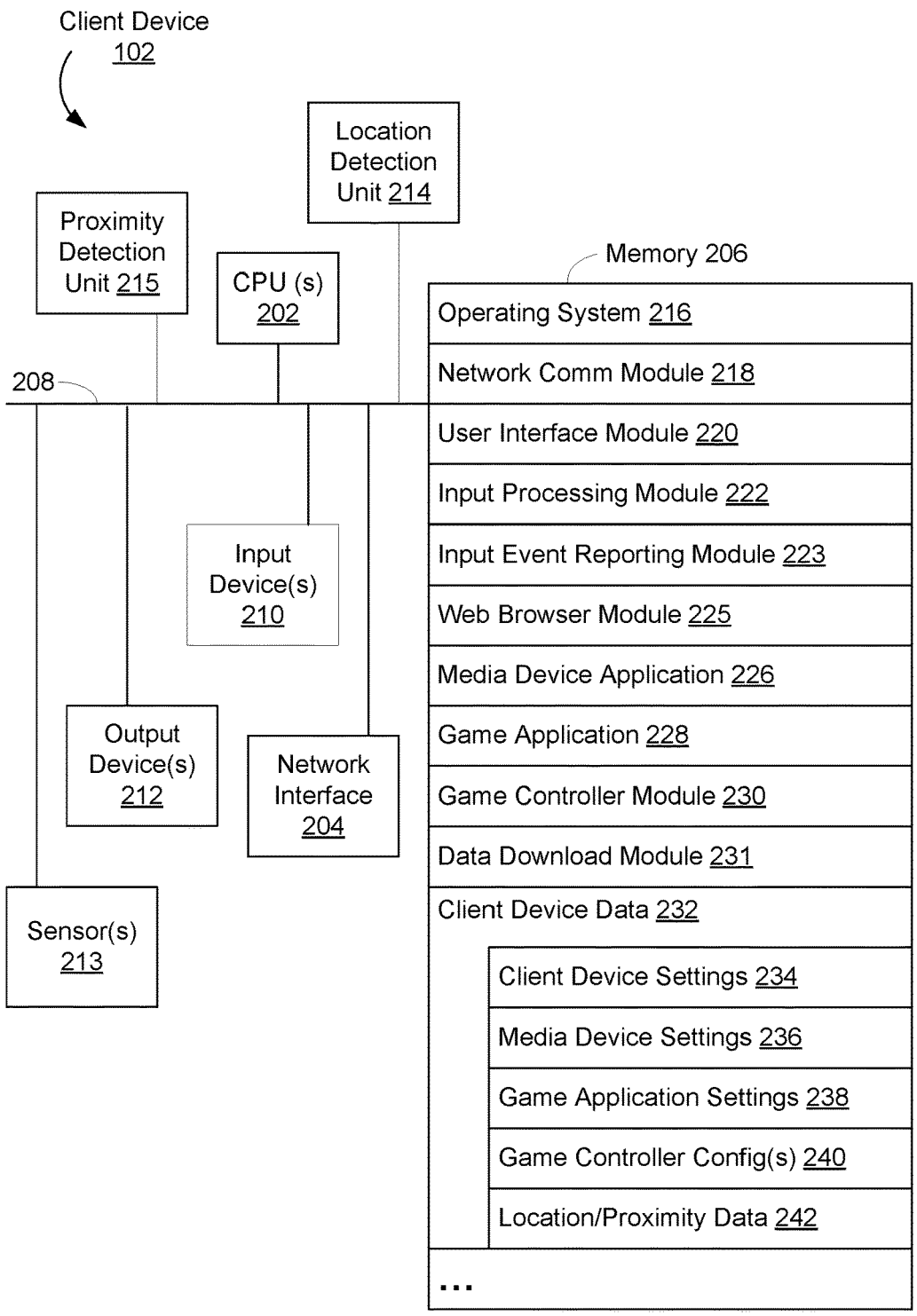
FIG. 2 is a block diagram illustrating an example client device of the gaming environment in accordance with some implementations.

FIG. 2 is a block diagram illustrating an example client device 102 of the gaming environment 100 in accordance with some implementations. Throughout this application, unless specified otherwise, reference to a client device 102 corresponds to one or more of the client devices 102A, 102B, and 104 described with reference to FIG. 1. Examples of the client device 102 include, but are not limited to, a mobile phone, a tablet computer, a laptop computer, a desktop computer, and a wearable personal device. In some implementations, the client device 102 is a dedicated game controller including game control inputs 210 (e.g., one or more buttons, joysticks, touch-screen elements, motion controls, pressure controls, vision controls, audio controls, and/or other haptic interface elements configured to control certain aspects of gameplay when activated). The client device 102 includes one or more processing units (CPUs) 202, one or more network interfaces 204, memory 206, and one or more communication buses 208 for interconnecting these components (sometimes called a chipset). The client device 102 includes one or more input devices 210 that facilitate user input, such as a keyboard, a mouse, a voice-command input unit or microphone, a touch screen display, a touch-sensitive input pad, a gesture capturing camera, or other input buttons or controls. Furthermore, some client devices 102 may use a microphone and voice recognition or a camera and gesture recognition to supplement or replace interfaces requiring contact (e.g., keyboard and buttons). In some implementations, the client device 102 includes one or more cameras, scanners, or photo sensor units for capturing images, for example, of graphic series codes printed on electronic devices. In some implementations, the client device 102 includes one or more output devices 212 that enable presentation of user interfaces and display content, including one or more speakers and/or one or more visual displays. Optionally, the client device 102 includes a location detection device 214, such as a GPS (global positioning satellite) or other geo-location receiver, for determining the location of the client device 102. The client device 102 may also include a proximity detection device 215, e.g., an IR sensor, for determining a proximity of a media device 106 and/or of other client devices 102. The client device 102 may also include one or more sensors 213 (e.g., accelerometer, gyroscope, etc.) for sensing motion, orientation, and other parameters of the client device 102, which may be used as input (e.g., for inputs 210 described above).

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 202. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

Operating system 216 including procedures for handling various basic system services and for performing hardware dependent tasks;

Network communication module 218 for connecting the client device 102 to other devices (e.g., the server system 114, the media device 106, and other client devices 102) via one or more network interfaces 204 (wired or wireless) and one or more networks 110 and/or 112, such as the Internet, other wide area networks, local area networks, metropolitan area networks, and so on;

User interface module 220 for enabling presentation of information (e.g., a graphical user interface for presenting applications, widgets, websites and web pages thereof, and/or games, audio and/or video content, text, etc.) at the client device 102 via one or more output devices 212 (e.g., displays, speakers, etc.);

Input processing module 222 for detecting one or more user inputs or interactions from one of the one or more input devices 210 and interpreting the detected input or interaction;

Input event reporting module 223 for reporting input identification and/or timestamp information to the server system 114 for use in latency calculations;

Web browser module 225 for navigating, requesting (e.g., via HTTP), and displaying websites and web pages thereof, including a web interface for joining the session 116;

Media device application 226 for interacting with a media device 106, including logging into a user account associated with the media device 106, controlling the media device 106 if associated with the user account, and editing and reviewing settings and data associated with the media device 106;

Game application(s) 228 for providing game(s) on the client device 102, including facilitating corresponding gameplay and facilitating invitation of additional players;

Game controller module 230 for providing a gameplay input interface to the game application(s) 228;

Data download module 231 for downloading data (e.g., game controller configurations 456 (FIG. 4), game applications 228 and other applications, updates to modules and applications and data in memory 206) from server system 114 and other content hosts and providers; and Client device data 232 storing at least data associated with the game application 228 and other applications/modules, including:
  Client device settings 234 for storing information associated with the client device 102 itself, including common device settings (e.g., service tier, device model, storage capacity, processing capabilities, communication capabilities, etc.);
  Media device settings 236 for storing information associated with user accounts of the media device application 226, including one or more of account access information, and information for device settings (e.g., service tier, device model, storage capacity, processing capabilities, communication capabilities, etc.);
  Game application(s) settings 238 for storing information associated with user accounts of the game application(s) 228, including one or more of account access information, in-game user preferences, gameplay history data, and information on other players;
  Game controller configuration(s) 240 for storing information associated with configurations (e.g., received configurations from game controller configurations 456, FIG. 4) of game controller module 230 for game application(s) 228; and
  Location/proximity data 242 including information associated with the presence, proximity or location of any of the client device 102 and the media device 106.

In some implementations, the game controller module 230 is a part (e.g., a sub-module) of the media device application 226 or another application in memory 206. In some implementations, the game controller module 230 is a part of the operating system 216. In some implementations, the game controller module 230 is a distinct module or application.

In some implementations of the client device 102, the media device application 226 (and corresponding media device settings 236) and game application 228 (and corresponding game application settings 238) are optional. Depending on the particular game to which the client device 102 is invited to join, the media device application 226 and the game application 228 are not required to play. If any of these applications are needed for playing the game (e.g., the game uses a game controller module 230 within the media device application 226), and the application is not in memory 206, the client device 102 may be prompted to download the application.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
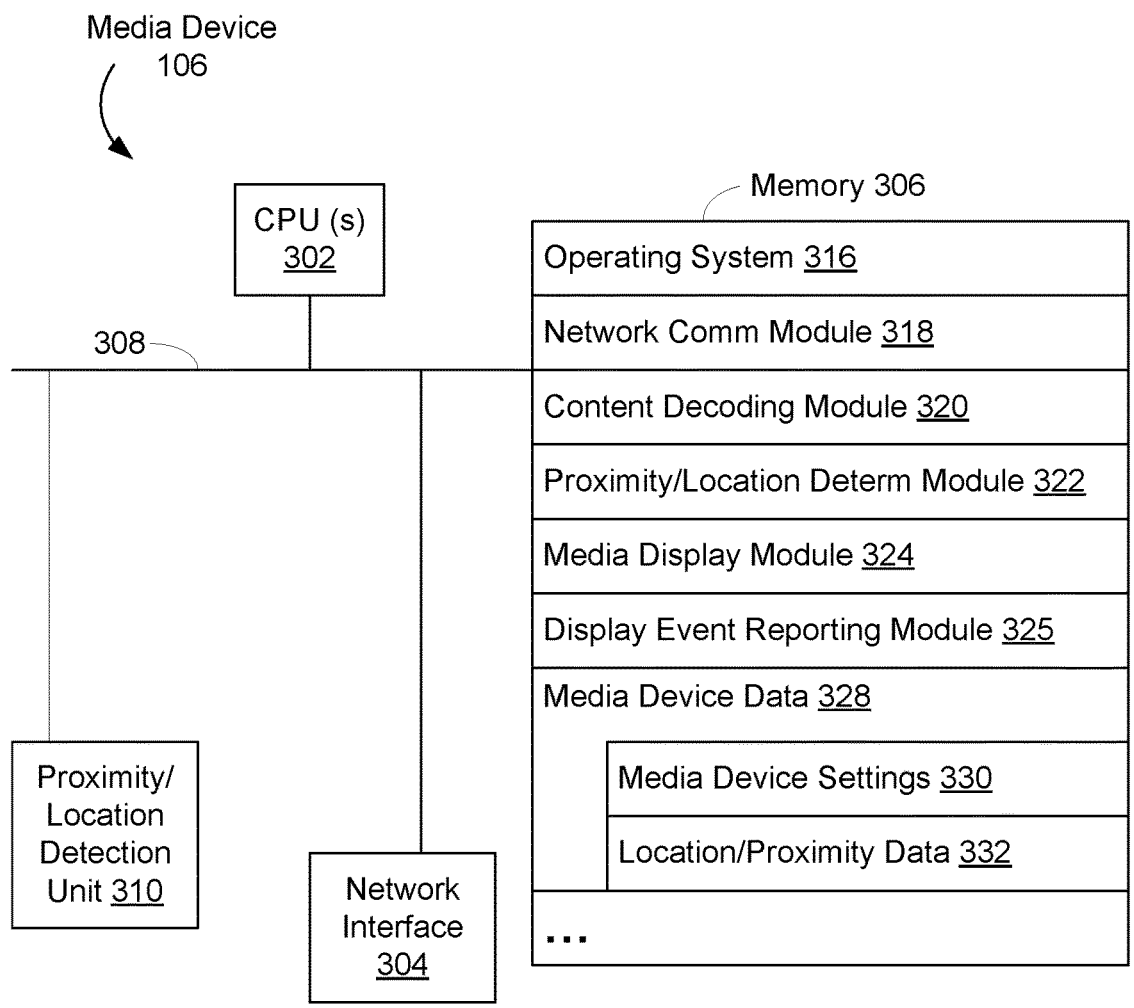
FIG. 3 is a block diagram illustrating an example media device of the gaming environment in accordance with some implementations.

FIG. 3 is a block diagram illustrating an example media device 106 of the gaming environment 100 in accordance with some implementations. The media device 106, typically, includes one or more processing units (CPUs) 302, one or more network interfaces 304, memory 306, and one or more communication buses 308 for interconnecting these components (sometimes called a chipset). Optionally, the media device 106 includes a proximity/location detection unit 310, such as an IR sensor, for determining the proximity of a client device 102.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

Operating system 316 including procedures for handling various basic system services and for performing hardware dependent tasks;

Network communication module 318 for connecting the media device 106 to other computers or systems (e.g., the server system 114, and the client device 102) via one or more network interfaces 304 (wired or wireless) and one or more networks 110 and/or 112, such as the Internet, other wide area networks, local area networks, metropolitan area networks, cable television systems, satellite television systems, IPTV systems, and so on;

Content Decoding Module 320 for decoding content signals received from one or more content sources (e.g., server system 114 for output from the game session 116) and outputting the content in the decoded signals to an output device 108 coupled to the media device 106;

Proximity/location determination module 322 for determining the proximity of the client device 102 based on proximity related information that is detected by the proximity detection unit 310 or provided by the server system 114;

Media display module 324 for controlling media display; and

Display event reporting module 325 for reporting display event identification and/or timestamp information to the server system 114 for use in latency calculations;

Media device data 328 storing at least data including:

Media device settings 330 for storing information associated with user accounts of a media device application, including one or more of account access information and information for device settings (e.g., service tier, device model, storage capacity, processing capabilities, communication capabilities, etc.); and Location/proximity data 332 including information associated with the presence, proximity or location of any of the client devices 102 and the media device 106.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

Figure 4:
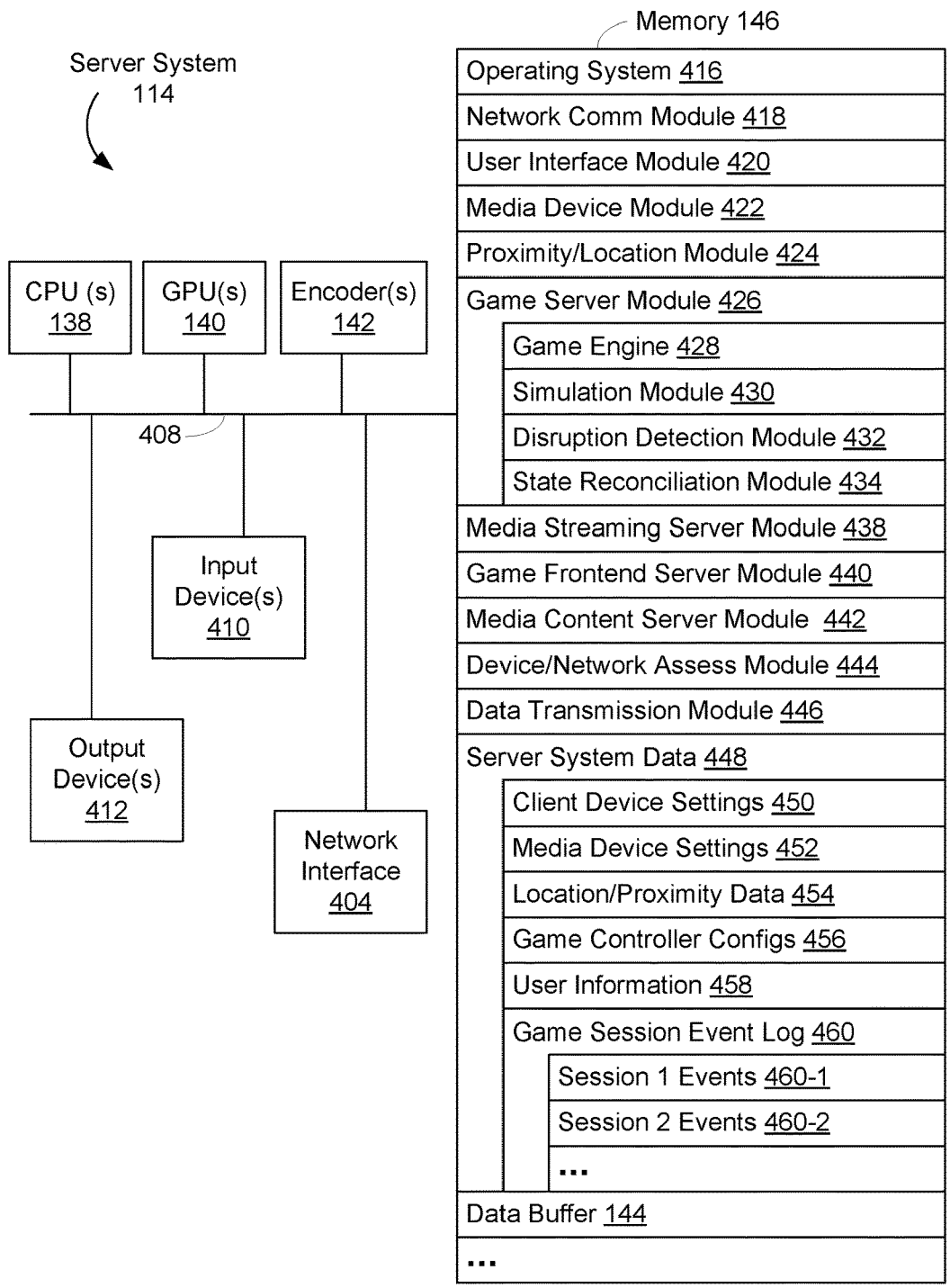
FIG. 4 is a block diagram illustrating an example server of the gaming environment in accordance with some implementations.

FIG. 4 is a block diagram illustrating an example server in the server system 114 of the gaming environment 100 in accordance with some implementations. The server system 114, typically, includes one or more processing units (e.g., CPU(s) 138, GPU(s) 140 and encoder 142), one or more network interfaces 404, memory 146, and one or more communication buses 408 for interconnecting these components (sometimes called a chipset). The server system 114 may optionally include one or more input devices 410 that facilitate user input, such as a keyboard, a mouse, a voice-command input unit or microphone, a touch screen display, a touch-sensitive input pad, a gesture capturing camera, or other input buttons or controls. Furthermore, the server system 114 may use a microphone and voice recognition or a camera and gesture recognition to supplement or replace the keyboard. In some implementations, the server system 114 optionally includes one or more cameras, scanners, or photo sensor units for capturing images, for example, of graphic series codes printed on electronic devices. The server system 114 may also include one or more output devices 412 that enable presentation of user interfaces and display content, including one or more speakers and/or one or more visual displays.

Memory 146 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 146, optionally, includes one or more storage devices remotely located from one or more processing units. Memory 146, or alternatively the non-volatile memory within memory 146, includes a non-transitory computer readable storage medium. In some implementations, memory 146, or the non-transitory computer readable storage medium of memory 146, stores the following programs, modules, and data structures, or a subset or superset thereof:

Operating system 416 including procedures for handling various basic system services and for performing hardware dependent tasks;

Network communication module 418 for connecting the server system 114 to other devices (e.g., various servers in the server system 114, client device(s) 102, and media device(s) 106) via one or more network interfaces 404 (wired or wireless) and one or more networks 110 and/or 112, such as the Internet, other wide area networks, local area networks, metropolitan area networks, and so on;

User interface module 420 for enabling presentation of information (e.g., a graphical user interface for presenting application(s), widgets, websites and web pages thereof, and/or games, audio and/or video content, text, etc.) at client device(s) 102;

A media device module 422 (optional) that is executed to provide server-side functionalities for device provisioning, device control, and user account management associated with media device(s) 106;

Proximity/location determination module 424 for determining the proximity of client device(s) 102 to the media device 106 based on location information of any of the client device 102 and the media device 106;

Game server module 426 for providing server-side functionalities associated with games (e.g., game application(s) 228), including but not limited to setting up game sessions, storing session state data and other game-related data, processing gameplay inputs from client device(s) 102, and rendering gameplay outputs in response to the gameplay inputs; the game server module including:

Game engine 428 for determining gameplay outputs based on (i) gameplay inputs, and (ii) game states corresponding to the gameplay inputs Simulation module 430 for simulating gameplay inputs (e.g., in accordance with a particular player's in-game behavior) during network disruptions between the player's gaming controller 102 and the server system 114;

Disruption detection module 432 for detection disruptions in or of a network connection between the server system 114 and the game controller 102 and/or the media device 106, the network connection supporting a gaming session between or involving one or more of the aforementioned components; and State reconciliation module 434 for processing recovered inputs upon resumption of a network connection between the server system 114 and the game controller 102, and reconciling simulation-affected game states with user-intended game states;

Media streaming server module 438 for hosting a media streaming site, receiving concurrent ancillary or supplemental media streams associated with an online gaming session, and providing the concurrent media streams to a client device 104 for concurrent display with the online gaming session that is being executed on the game applications 228 of the same client device 104 or a distinct client device 102;

Frontend server module 440 for managing user accounts associated with the client devices 102, e.g., subscriptions to membership of one or more online interactive games by a user account, enabling service to subscribers for forwarding subscriber requests to the game server module 426, and monitoring gameplay activity and related requests of subscribers;

Media content server module 442 for providing access to gaming content hosted by one or more third party content providers;

Device/network assessment module 444 for assessing device and network capabilities of client device(s) 102, including but not limited to assessing network bandwidth of the connection to the client device 102 and assessing whether the client device 102 has the needed module or application to play a game;

Data transmission module 446 for providing data (e.g., game controller configurations 456, software updates, etc.) to client devices 102; and Server system data 448 including:
- Client device settings 450 for storing information associated with the client device(s) 102, including common device settings (e.g., service tier, device model, storage capacity, processing capabilities, communication capabilities, etc.);
- Media device settings 452 (optional) for storing information associated with user accounts of the media device application 422, including one or more of account access information and information for device settings (e.g., service tier, device model, storage capacity, processing capabilities, communication capabilities, etc.);
- Location/proximity data 454 including information associated with the presence, proximity or location of any of the client device 102 and the media device 106;
- Game controller configurations 456 for storing controller configurations for various games;
- User information 458 for storing information associated with user accounts of each of one or more game applications (e.g., game application 228, FIG. 2) that are hosted on the server system 114, including for example user account information (e.g., identification and passwords), membership type, preference, activity history, and gaming behavior data for particular games (e.g., for use by the simulation module 430);
- Game session event log 460 for storing event data associated with game sessions (e.g., game state data, gameplay inputs, and other game-related data), including, for example, data 460-1 for a first game session and data 460-2 for a second game session, where the session data 460 for each game session includes, but is not limited to game state data, gameplay inputs, and other session data such as frame rates, rendering specifications, normal latency requirements, GPU allocations, encoder allocations, and status information associated with the respective game session (e.g., network connection status information detailing whether there is a disruption in a network connection between the server system 114 and the controller 102 and/or the media device 106); and
- Data buffer 144 for temporarily storing gameplay multimedia content generated by the GPU 140 in association with one or more output media streams.

In some implementations, the game server module 426 includes the following programs, modules, or a subset or superset thereof:

Intent determination module 428 for comparing user input transit times (e.g., between the client device 102 and the server system 114) with display transit times (e.g., between the media device 106 and the server system 114), and determining the user's intent behind particular inputs by matching input events with respective trigger frames;

Latency adjustment module 430 for determining a number of intermediate frames for the GPU 140 to insert between (i) a current frame being processed at the time a user input is received and (ii) a response frame showing a result of the received input;

Resource allocation module 432 (optionally referred to herein as a "session orchestrator") for receiving session requests from endpoints (e.g., controllers 102) and determining which resources to assign to the session; and Resource tuning module 434 for determining latency tolerances for particular users.

In some implementations, the memory 146 further includes a data buffer 144 configured to couple the encoder 142 to the GPU 140. Specifically, the data buffer 144 temporarily stores gameplay multimedia content generated by the GPU 140 in association with one or more output media streams, such that the encoder 142 can retrieve the gameplay multimedia content from the data buffer 144 and encode the retrieved content to the one or more media streams, e.g., for standardization, speed or compression.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 146, optionally, stores a subset of the modules and data structures identified above. Furthermore, memory 146, optionally, stores additional modules and data structures not described above.

Example Gaming Process

The various implementations of cloud-based gaming platforms described above provide many benefits (e.g., portability, scalability, efficiency, ease of access and control, and so forth). However, the cloud-based nature of these gaming platforms comes with various challenges, such as variability in network and processing resources, which may negatively affect the gameplay experience if not proper accounted for.

Such challenges can potentially create an uneven gaming experience due to variable latencies and momentary connection disruptions in the networks 110/112 between client devices 102 and the server system 114. The following disclosure describes various implementations which compensate for momentary network disruptions that may exist in real-time interactive cloud-based gaming environments. By compensating for these disruptions, the implementations described herein provide a smooth and uniform gaming experience for each player.

Figure 5A:
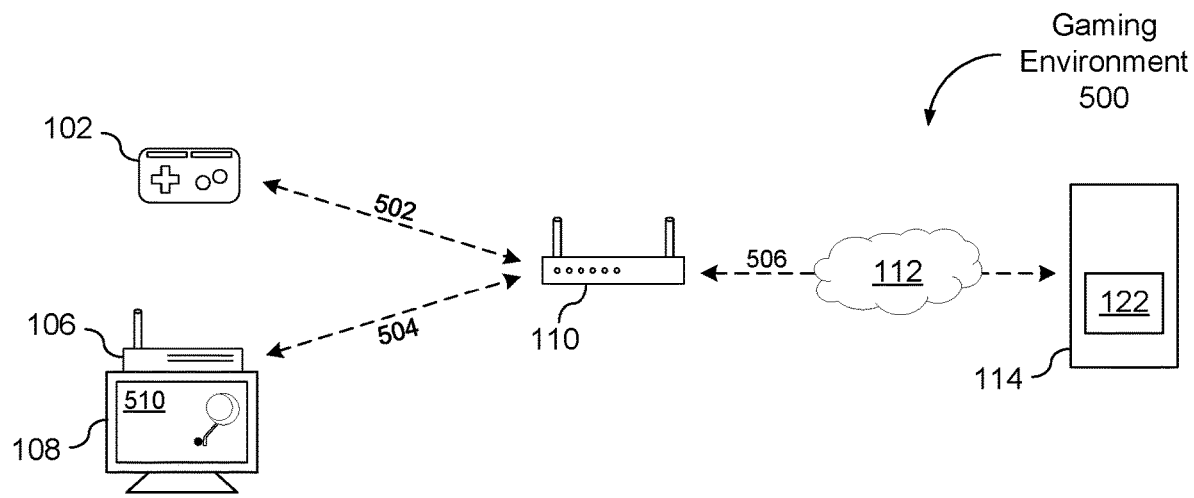
FIG. 5A is an example gaming environment in accordance with some implementations.

FIG. 5A depicts an example gaming environment 500. Gaming environment 500 is an example implementation similar to gaming environment 100 (FIG. 1), with corresponding components similarly labeled. The gaming environment 500 includes a client device 102 (also referred to herein as a "game controller" or "controller"), which a player (or "user") uses to control various aspects of the game (or "gameplay") by, for example, activating or manipulating inputs 210 (FIG. 2). The gaming environment 500 also includes a media device 106 (e.g., a set-top box) and an output device 108 (e.g., a television or other output display). The controller 102 and the media device 106 are communicatively coupled to a local network 110 (depicted, in this example, as a wireless router) via local communication links 502 and 504, respectively (e.g., through WiFi). The local network 110 is communicatively coupled through a communication link 506 to a server system 114 via communication network(s) 112 (e.g., the internet). The server system 114 includes a game server 122 (FIG. 1).

While the gaming environment 500 depicted in the figure only includes a single local network 110 with a single controller 102, some implementations of the gaming environment 500 may include a plurality of local networks 110, with some of the local networks 110 including more than one controller 102 (e.g., for multiplayer games sharing the same gaming session, as described with reference to FIGS. 1-4 above).

Several elements that are present in the gaming environment 500 can introduce network disruptions that are both appreciable (e.g., impacting at least one frame) and time-varying. For instance, the local network 110 (e.g., WiFi) can introduce various amounts of latency in communication links 502 and 504. Average latency can be very low (e.g., <1 ms) if there is no contention on the channel. However, in busy environments such as apartment buildings with overlapping WiFi networks or gameplay environments with multiple wireless client devices, average amounts of latency in the 10-50 ms range are more common, with 200+ ms outliers.

Further, the communication network(s) 112 (e.g., the internet) can introduce latency causing momentary disruptions in communication link 506. This latency may be less highly variable than WiFi for most users; however, in peak gaming hours (early evening), media sharing (e.g. on Cable modems) as well as network saturation can result in delayed or dropped packets. The average latency will depend on distance from the local network 110 to an edge server of the server system 114, with example amounts of latency in the 20-30 ms range. Further, the likelihood of momentary connection disruptions increases with the distance between the local network 110 and an edge server of the server system 114.

Since some implementations of the gaming environment 100/500 have separate network connections between the controller 102 and the server system 114 (e.g., 502/506), versus the output device 108 and the server system 114 (e.g., 504/506), disruptions in the network path between the controller and the server may not necessarily affect the network path between the server and the output device. In these situations, a user may experience momentary disruptions with the gaming controller 102 while gameplay events are continuously rendered on the output device 108. Therefore, it is important to accurately compensate for network disruptions between the controller 102 and the server system 114 in order to ensure user intent (e.g., an intended gameplay input) is correctly accounted for in the gameplay experience.

Figure 5B:
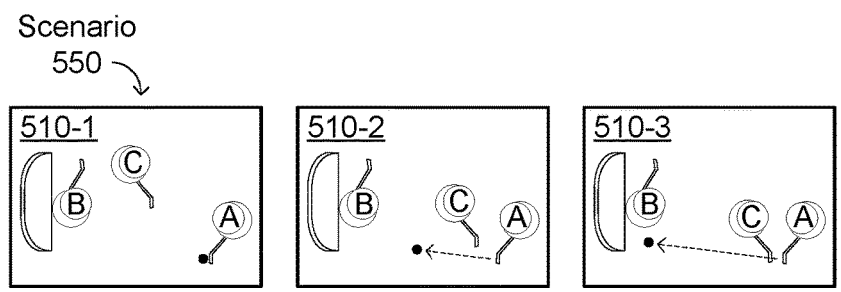
FIGS. 5B-5C illustrate example gameplay scenarios in accordance with some implementations.
Figure 5C:
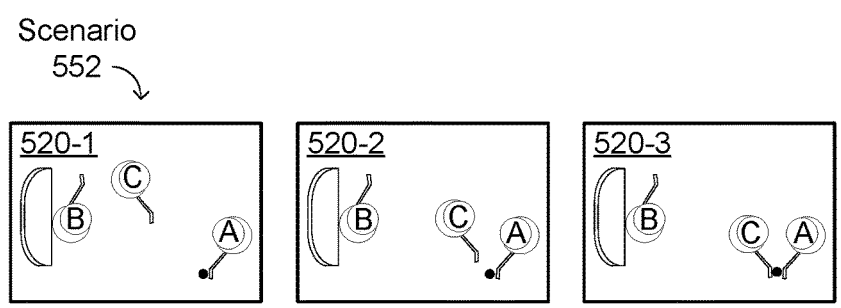

The network issues described above (e.g., latency and dropped packets) may have significant effects on the gameplay experience. FIGS. 5B and 5C show two example gameplay scenarios resulting in entirely different outcomes due to network connection disruptions. Before describing these examples in detail, however, it is first necessary to describe an example gameplay process.

Figure 6:
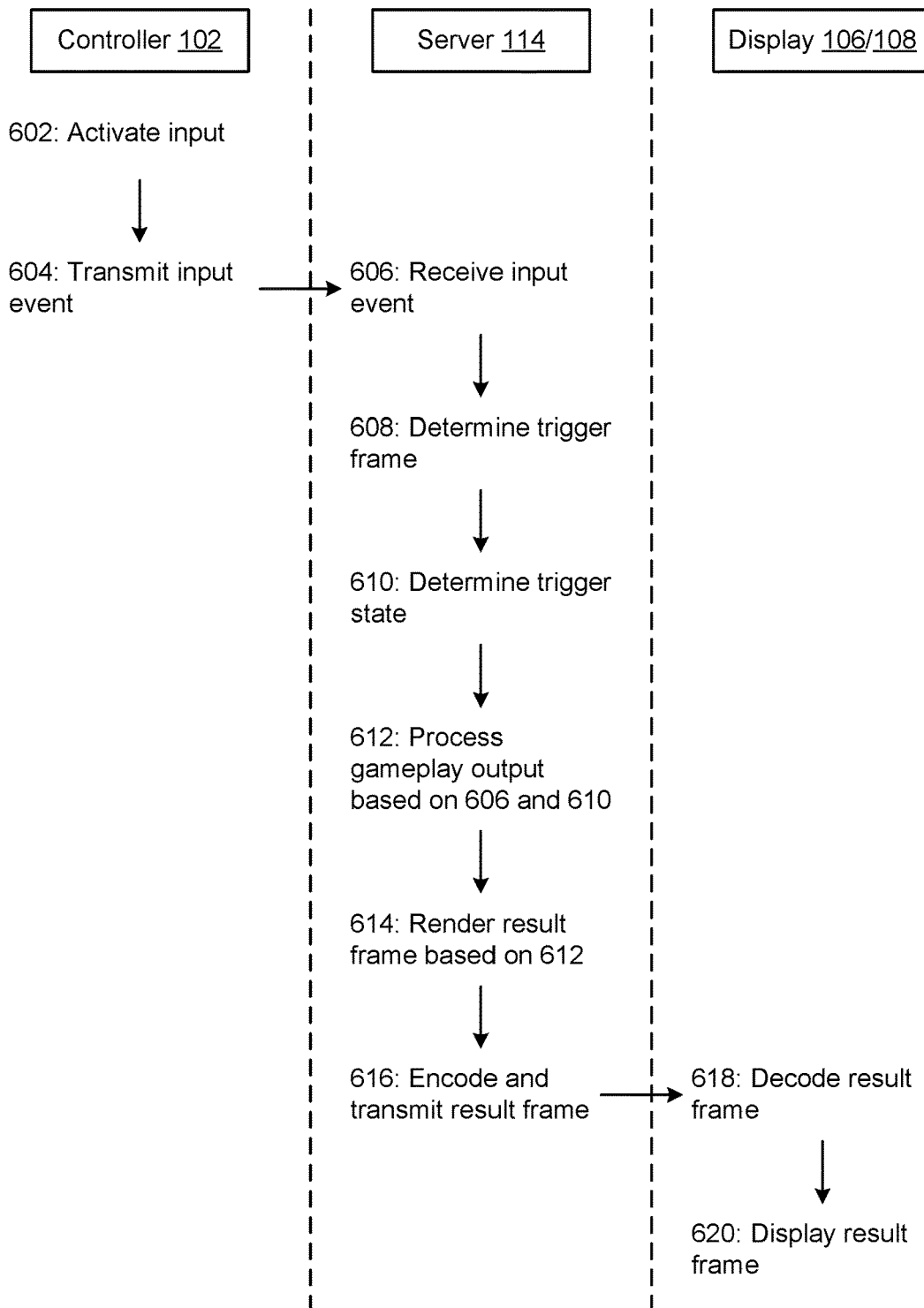
FIG. 6 is a flow diagram of a gameplay process in accordance with some implementations.

FIG. 6 is a flow diagram of a gameplay process 600 in accordance with some implementations. The process may be performed at an electronic server (e.g., server system 114, or more specifically, game server 122) having one or more processors (e.g., CPU 138 and/or GPU 140) and memory (e.g., memory 146) storing one or more programs for execution by the one or more processors; a media device (e.g., media device 106) having one or more processors (e.g., CPU 302) and memory (e.g., memory 306) storing one or more programs for execution by the one or more processors; and/or a user device (e.g., controller 102) having one or more processors (e.g., CPU 202) and memory (e.g., memory 206) storing one or more programs for execution by the one or more processors. In some implementations, the server, media device, and user device include one or more programs and memory storing one or more respective programs for execution by the one or more respective processors, and the one or more programs include instructions for performing the process 600. In some implementations, respective non-transitory computer readable storage media store one or more respective programs, the one or more respective programs including instructions, which, when executed by an electronic server, the media device, and the user device, with one or more respective processors, causes the electronic server, the media device, and the user device to perform the process 600. Some operations in process 600 may be combined and/or the order of some operations may be changed.

A user of controller 102 (also referred to herein as a "player") uses the controller 102 to influence events in the game, which are depicted by video frames (e.g., 510) displayed on the output device 108 (see FIG. 5A). When the player decides to influence gameplay (e.g., by moving a virtual player, shooting a hockey puck, and so forth), the player activates (602) or otherwise manipulates an input 210 on the controller 102 (e.g., presses a button). The activation or manipulation of an input 210 on the controller 102 is referred to herein as a "user input," a "user gameplay input," an "intended input," an "input event," and a "command." The input event is communicated (604), via communication links 502 and 506 (over networks 110 and 112) to the server system 114 (e.g., to an event log 460 associated with the game session).

Upon receipt (606) of the input event, the server system 114 optionally determines (608) which frame was displayed on the output device 108 at the time the user activated the input associated with the received input event. The frame that was displayed to the user at the time the user activated the input is referred to herein as the "trigger frame," because it triggered the user to respond by activating the input.

The game server optionally 122 determines (610) the state of the game associated with the input event (referred to herein as the "trigger state"). Optionally, the trigger state is determined based on the trigger frame determined in step 608. In some implementations, the game server 122 determines the trigger state by consulting a log of game states maintained in an event log 460 (FIG. 4). In some implementations, the event log 460 includes a log of game states that is indexed by frame fingerprints, frame IDs, and/or game time data (e.g., timestamps or clock data). In some implementations, the game server 122 determines the trigger state by determining a game time index associated with the trigger frame or with the input event, and consulting the event log 460 to determine the state of the game that existed at the time of the game time index associated with the trigger frame. Depending on how much time passed between the displaying of the trigger frame on output device 108 and the receiving of the input event at the game server 122, the trigger state may be in the past, relative to a current state being processed at the game server 122.

Having determined the trigger state, the game server 122 (e.g., GPU 140) processes (612) a subsequent game state (sometimes referred to herein as a "gameplay output") in accordance with (i) the input event (e.g., "shoot puck"), and (ii) the trigger state (e.g., the game state that existed or was displayed at the time the user entered the "shoot puck" input). In some implementations, processing a gameplay output comprises inputting the input event into an algorithm or game engine that determines gameplay outputs based on input events and corresponding game states. For example, a game engine may determine the next game state based on the state/location of each player and the puck in relation to the goal during the current game state, as well as any input commands received with respect to the virtual players (e.g., "move," "shoot," or "block") during the current game state. In some implementations, processing the subsequent game state (the gameplay output) in accordance with the input event and the trigger state includes processing the input event as if it had been available to the server at the time the server was processing a game state proximate to the trigger state (e.g., the next state after the trigger state, or a state closely following the trigger state).

Upon processing the gameplay output, the game server 122 renders or otherwise processes (614) a frame or a series of frames depicting the processed gameplay output. The frame (or the first of the series of frames) depicting the gameplay output is referred to herein as the "response frame(s)." For example, if the input event and trigger state result in a gameplay output including movement of a particular virtual player, the response frame is a frame that depicts the particular virtual player in a modified spatial location with respect to other objects in the frame, consistent with the direction specified by the user input. Alternatively, if the input event and the trigger state result in a gameplay output of a particular virtual player shooting a puck, the response frame is the first of a series of frames that depict the particular virtual player shooting the hockey puck. In some implementations, rendering the response frame comprises introducing a new virtual object, modifying an existing virtual object, or modifying any other aspect of gameplay in accordance with the processed gameplay output, and including the new virtual object, the modified existing virtual object, or any other aspect of the modified gameplay in the response frame.

The server system 114 proceeds to encode the response frame (e.g., using encoder 142) and transmit (616) the encoded response frame to the media device 106. Upon receiving the encoded response frame from the server system 114, the media device 106 decodes (e.g., using content decoding module 320) the response frame, and causes the decoded response frame to be displayed (620) to the user (e.g., using output device 108).

Returning to FIGS. 5B and 5C, two sequences of video frames (510 and 520) are depicted showing the same initial game state (depicted in frames 510-1 and 520-1). These sequences are examples of the gameplay process 600 applied to the gaming environment 500.

FIG. 5B depicts a first scenario 550, including a sequence of video frames 510 showing three virtual players (A, B, and C) playing a hockey game. Player A is controlled by the user of controller 102, and Players B and C are controlled by other users of other controllers, by computer-controlled algorithms, or by a combination thereof. At the initial game state (depicted in frame 510-1), Player A has a clear shot on the goal. When the user controlling Player A views frame 510-1 on the display 108, the user sees that Player A has a clear shot on the goal, and therefore decides to command Player A to shoot the puck. In other words, frame 510-1 triggers the user to input a "shoot" command. The "shoot" command is sent as an input event to the game server 122. When the game server 122 receives the "shoot" input, the game engine updates the game state depicted in frame 510-1 based on the "shoot" input and the game state itself (e.g., the location of the players, the location of the puck, whether there is a clear path between Player A and the goal, and so forth). The updated game state (the gameplay output) is depicted by frames 510-2 and 510-3, which show the puck moving towards the goal before Player C has a chance to block it. Stated another way, according to the game engine, if a player shoots while the player has a clear shot, the subsequent state includes a successful shot sequence. As such, the game server generates response frames 510-2 and 510-3, depicting the subsequent state and transmits the response frames to the user (e.g., to media device 106 for display on output device 108). From the user's perspective, the response frames depict the actions that the user intended at the time of the input event. As such, by correctly determining the trigger state corresponding to the user's input, the game server processes gameplay events based on the user's intent at the time the user entered the gameplay input.

FIG. 5C depicts a second scenario 552, including a sequence of video frames 520 showing the same game and players as in scenario 550. Like the previous scenario, at the initial state depicted in frame 520-1, Player A has a clear shot on the goal; accordingly, the game server transmits a frame 520-1 to the user's display 108 denoting this state. When the user views frame 520-1 on the screen 108, the user sees that Player A has a clear shot on the goal, and therefore decides to command Player A to shoot the puck. The "shoot" command is sent as an input event to the game server 122. However, unlike the previous scenario, there is a disruption in the network connection between the controller 102 and the server system 114 which delays receipt of the input event at the server. If the input event eventually does reach the server, the server likely would not correctly determine the trigger state (depicted in frame 520-1) since, due to the delay, the server is processing subsequent game states at the time the input event reaches the server. As such, the game server instead processes a gameplay output based on the game state at the time the input event is received (depicted in frame 520-2). In this example, the current state does not include a clear shot. According to the game engine, if a player shoots while the player does not have a clear shot, the subsequent state includes a blocked shot. As such, the game server renders a response frame 520-3 depicting Player A attempting to shoot the puck but being blocked by Player C, and transmits the response frame to the user (e.g., to media device 106 for display on output device 108). From the user's perspective, the response frame depicts actions that the user did not intend at the time of the input event. Specifically, the user intended to have Player A shoot while Player C was not in the way; instead, Player A did not shoot as quickly as the user intended and the shot was blocked as a result. As such, by failing to account for delayed receipt of gaming inputs, the game server may process gameplay events contrary to the user's intent, which may potentially cause the user (and many other users) to lose interest in playing the game and/or using the gaming environment 500.

In alternative scenarios, if the server system 114 detects the network disruption between the gaming controller 102 and the server system 114 described in scenario 552 above, the server may either disregard the user's gameplay inputs that were sent during the disruption, or pause gameplay until the disruption is resolved. If the game is a multi-player game, pausing gameplay for one player may also cause the game to be paused for the other players. As can be imagined, the more players playing a game, the higher the probability that one player may experience a temporary network disruption, which means the game would be paused more often. Pausing the game interrupts game flow entirely, which prevents a seamless, continuous gaming experience for each user. Further, disregarding gameplay inputs may result in game states that are contrary to user intent. These outcomes may also potentially cause users to lose interest in playing the game and/or using gaming environment 500.

In each of the scenarios described above, the input event occurs at the same time; however, depending on how long it takes for the input event to reach the game server, the response frame may depict various different outcomes. This is because if the server receives the user's input while processing a game state that is later in time than the game state that triggered the user to make the input, the server may incorrectly process a gaming output based on incorrect information about the timing of the user input. Since it is paramount for the gaming platform to avoid this kind of inconsistency, it is important for the gaming platform to compensate for the various network disruptions introduced in the gaming environment. By compensating for network disruptions between the gaming controller 102 and the server system 114, the gameplay platform can (i) more accurately correlate input events with the actual trigger states, and (ii) ensure a seamless, continuous gaming experience that is consistent with the user's intent, even under spotty connection conditions. As such, the various implementations described herein are an improvement over: gaming platforms that do not attempt to compensate for network disruptions in a way that is consistent with the user's intent during the disruption; and gaming platforms that inaccurately compensate for network disruptions in a way that is consistent with the user's intent during the disruption.

In certain scenarios, depending on how much time has passed between the trigger state and a current state being processed by the game server, a particular gameplay output may contradict what has already been displayed to one or more users. For example, in FIG. 5C, frame 520-3 depicts a blocked shot. However, if the game server determines that the trigger state was the state depicted in frame 520-1, in some implementations, the game server attempts to retroactively reconcile the user's intent with the current state of the game. In other words, the user's intent was to shoot the puck while Player A had a clear shot, while the current state of the game is displaying player C between Player A and the goal. In order to reconcile the user's intent (puck moving toward goal) with the current state (Player C in the puck's way), the game server may render a sequence of response frames with the puck moving toward the goal, despite Player C being in the way (e.g., frame 510-3, FIG. 5B). The response frames may appear to be inconsistent with the current game state; however, they are consistent with the user's intent during the past (trigger) game state. Game developers may plan for these contingencies in advance by, for example, designing animations that reconcile inconsistent game states. Example reconciliation animations include immediately shifting a virtual character or object to an intended position (even if this may appear to violate the in-game physics), or advancing the game state in the intended manner without showing the correct animation (e.g., updating the score without showing the puck arrive at the goal, or classifying a monster as having sustained a wound even though the monster appeared to have moved out of the way before being shot). In some implementations, reconciling a current game state with a game state intended by the user at the time of the user interaction (the intended game state) comprises modifying a frame depicting the current game state to create a subsequent frame depicting, or more closely matching, the intended game state.

Disruption Compensation

The following discussion describes various approaches, in accordance with some implementations, to compensating for network disruptions between the gaming controller 102 and the server system 114, thereby ensuring that the user's actual inputs (and by extension, the user's intent) are correctly accounted for in the gameplay experience.

Figure 7:
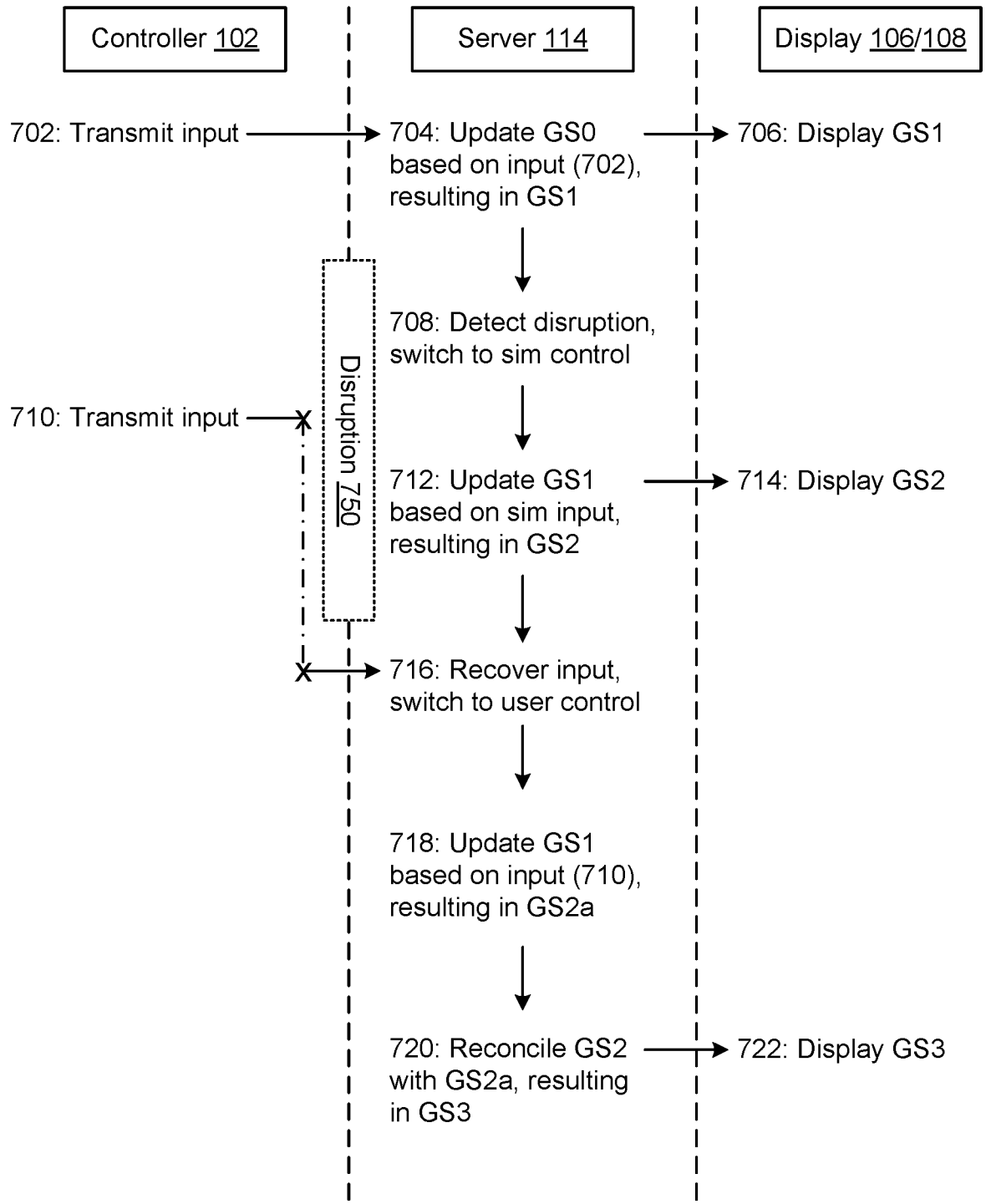
FIG. 7 is a flow diagram illustrating an example method for compensating for network disruptions in accordance with some implementations.

FIG. 7 is a flow diagram illustrating an example method 700 for compensating for network disruptions between a gaming controller 102 and a server system 114 in accordance with some implementations. Method 700 is, optionally, governed by instructions that are stored in a computer memory or non-transitory computer readable storage medium (e.g., the game controller module 230 in FIG. 2, the media display module 324 in FIG. 3, and/or the game server module 426 in FIG. 4) and that are executed by one or more processors of the gaming controller 102 (e.g., CPU 202), the media device (e.g., CPU 302), and/or the server system 114 (e.g., CPU 138 and/or GPU 140). The computer readable storage medium(s) may include a magnetic or optical disk storage device, solid state storage devices such as Flash memory, or other non-volatile memory device or devices. The instructions stored on the computer readable storage medium(s) may include one or more of: source code, assembly language code, object code, or other instruction format that is interpreted by one or more processors. Some operations in method 700 may be combined and/or the order of some operations may be changed.

Method 700 is performed by a gaming controller (sometimes referred to herein as a "client device") 102, a media device 106, and a server system 114 including one or more processing cores (e.g., CPUs 202, 303, 138, and/or GPU 140) and memory storing programs for execution by the processing cores.

A game controller 102 associated with a user transmits (702) one or more user inputs associated with the user's commands (e.g., "move" or "shoot puck") with respect to a game being played in a real-time interactive gaming session (e.g., gaming environment 100/500). The network communication module 418 of the server system 114 receives the user input, and the game engine 428 updates (704) a current game state GS0 based on the received user input. The updated game state is referred to as GS1, and is based on the game state GS0 and the received user input. The server system 114 generates one or more response frames depicting the game state GS1 (e.g., using encoder 142) and transmits the response frame(s) to the media device 106 for display (706) to the user on the output device 108.

The actions described in 702-706 are repeated for subsequently received user inputs until the disruption detection module 432 of the server system 114 detects (708) a disruption 750 in the network connection between the server system 114 and the game controller 102. In some implementations, the server system 114 may not affirmatively detect a network disruption 750; in these implementations, the server system 114 uses another indicator to determine that communication with the game controller 102 may be disrupted, such as a difference in expected gameplay behavior (e.g., based on the user's gaming behavior profile stored in user information 458) compared to actual gameplay behavior (e.g., user inputs received from the game controller 102 in the context of associated game states).

Upon detection of a disruption 750, the simulation module 430 takes over gameplay inputs on behalf of the user of the controller 102 while the controller 102 and the server system 114 attempt to reconnect. In some implementations, the simulation module 430 takes over gameplay inputs on a temporary basis (e.g., for a predetermined amount of time since initial detection of the disruption) and then ceases to control gameplay actions. In some implementations, the simulation module 430 takes over gameplay actions until communications with the controller 102 are reestablished (e.g., due to resumption of the network connection). The simulation module 430 simulates either direct user inputs (e.g., from the game controller) or in-game behaviors.

In some implementations, the simulation module 430 runs in parallel with normal gameplay (e.g., before any disruption). Stated another way, while the user is actively controlling gameplay events by transmitting user inputs in response to particular game states, the simulation module 430 is predicting the user's inputs based on those particular game states. When the user sends an input to the server system 114, the simulation module compares the user's actual input with the simulation's predicted input (or lack thereof) in order to determine accuracy of the simulation's predicted input (or lack thereof) in response to the particular game state. By running in parallel with active gameplay, the simulation's predicted inputs can more efficiently be accessed in the event of a disruption 750. Further, by running in parallel with active gameplay, the simulation can constantly improve simulation accuracy of the user's in-game behavior for particular games, game states, scenarios, and so forth.

In some implementations, the simulation module 430 uses machine learning to train itself to accurately model a particular user's in-game behavior. A simulation that uses machine learning is sometimes referred to herein as an "AI" (artificial intelligence) simulation. In some implementations, as the AI continues to train, the simulation module creates a gaming behavior profile for the user. In some implementations, the gaming behavior profile is stored in a user information portion 458 of memory 146 of the server system 114. As the AI continues to play the game along with the user, the AI further updates the user's gaming behavior profile and uses the profile as a basis to inform future predictions. By having the AI constantly play the game along with the user, the AI can automatically check to see how accurate it is after every user input, or after a subset of user inputs, and learn from mistakes (differences between predicted inputs and actual inputs). For example, in a game involving a character traversing a map, if there is a similar path the character takes every time the character is in a particular position during a particular game state, the AI learns to move the character in that path in the event of a disruption. In some implementations, there are different sets of heuristics for different types of games and for different game states.

In some implementations, as an alternative to real-time training of the AI, the user's inputs and corresponding game states are saved in an event log 460, and the simulation module 430 uses those inputs and corresponding game states to play and learn the user's in-game behavior offline (e.g., after the gaming session is complete). By training the AI at a different time, the server system 114 can more efficiently use processing power during peak gameplay times.

In some implementations, the simulation module 430 simulates inputs that deviate from the AI's best guess as to what the user would have done in certain scenarios. For example, in some implementations, the simulation module 430 plays the game (simulates gameplay inputs) on a more conservative basis during the disruption. For example, by playing conservatively, the AI is less likely to cause major game-changing events, such as initiating an offensive move (e.g., combat, throwing a grenade) against another character in a role playing game. Further, in some implementations, if a character controlled by the user is in a defensive state (e.g., crouched) at the time of the disruption, the likelihood of initiating an offensive move is lower; therefore, the AI is less likely to initiate an offensive move in these scenarios. In some implementations, when it is difficult for the simulation module 430 to decide between two inputs, where one input would resolve a player/player conflict in any manner (either shoot opponent or be shot by opponent) and the other move would maintain the status quo (temporarily hide), there is a bias towards not resolving (leaving open) conflicts between players until the network connection with the controller comes back and the game engine can process a gameplay output based on the user's intended input. Stated another way, there is a bias towards not resolving player/player conflicts until seeing what the user would have done had the disruption not occurred.

Referring back to FIG. 7, while the simulation module 430 is controlling gameplay inputs on the user's behalf during the disruption 750, the user may still be attempting to actively control the game. During this time, the game controller 102 continuously attempts to transmit (710) the user inputs to the server system 114. Also during this time, the game engine 428 uses one or more simulated user inputs to update (712) the game state GS1, resulting in an updated game state GS2. The game state(s) GS2 are sometimes referred to herein as "placeholder game state(s)," since they serve as a placeholder for the user's intended gameplay outcomes during the disruption. In some implementations, the placeholder game state GS2 is an immediate byproduct of the simulated gameplay input; in other words, when a gameplay input is entered into the game engine 428, the game engine produces a gameplay output based on the gameplay input without waiting for additional gameplay inputs. Alternatively, the game engine 428 processes one or more inputs at a time, determining a gameplay output based on the one or more gameplay inputs. In some implementations, the game engine 428 stores, or causes to be stored, each gameplay output which is based on a simulated input (e.g., each placeholder game state) in a game state repository (e.g., in event log 460) for later comparison to intended game states, as discussed in detail below. In some implementations, for each placeholder game state GS2, the server system 114 generates one or more response frames depicting the game state GS2 (e.g., using encoder 142) and transmits the response frame(s) to the media device 106 for display (714) to the user on the output device 108.

When the network connection between the server system 114 and the game controller 102 resumes, ending the disruption 750, the server system 114 receives (716) the user input 710 made by the user of the client device during the disruption (referred to herein as "recovered user input"). In some implementations, the server system 114 determines if a received user input is a recovered user input based on a comparison of a timestamp associated with the received user input to a current game time index. If the user input is associated with a timestamp that corresponds with a time during which there was a disruption, then the user input is a recovered user input corresponding to a command made by the user during the disruption. Depending on the communication protocol between the game controller 102 and the server system 114, and the timing of the disruption, the recovered user input may have been transmitted from the client device before, during, and/or after the disruption.

The state reconciliation module 434 of the server system 114 updates (718) the game state GS1 (the game state that was used, along with the simulated input in step 712, as a basis for game state GS2) based on the recovered user input, resulting in an alternatively derived game state GS2, referred to herein as game state GS2a. The game state GS2a is sometimes referred to herein as an "intended game state" because it depicts the outcome that would have occurred if there were no disruption—the outcome that the user intended at the time the user entered the input for transmission to the server (step 710). It is important to note that the recovered user input is used to update the game state that existed just before, or proximate to, the beginning of the disruption 750 (game state GS1). In some implementations, the state reconciliation module 434 obtains the placeholder game state(s) GS2 from the game state repository in event log 460. By updating the game state that existed before the simulated inputs replaced the user inputs, the server system 114 has a basis to compare its predictions (the simulated inputs) with the user's intent (the recovered user inputs), by generating two versions of a game state—one version that is the result of simulated gameplay inputs (placeholder game state GS2), and another version that is the result of recovered user inputs (intended game state GS2a)—and comparing the game states to determine the accuracy of the placeholder game state GS2.

The state reconciliation module 434 of the server system 114 reconciles (720) the placeholder game state GS2 with the intended game state GS2a based on the comparison discussed above (e.g., comparing the placeholder and intended game states), resulting in a subsequent game state GS3 which matches, or more closely matches, the user's intent. Stated another way, when the controller 102 is reconnected with the server system 114, the state reconciliation module 434 attempts to reconcile the extant game state resulting from simulated game play (GS2) with the game state that would have pertained had the user maintained control (GS2a), resulting in a subsequent game state GS3. In some implementations, the subsequent game state GS3 is an updated version of the placeholder game state GS2, influenced by differences between the placeholder game state GS2 and the intended game state GS2a. The server system 114 generates one or more response frames depicting the game state GS3 (e.g., using encoder 142) and transmits the response frame(s) to the media device 106 for display (722) to the user on the output device 108.

In some implementations, the subsequent game state GS3 is additionally or alternatively based on a comparison of the recovered input to the simulated input. Specifically, when the controller 102 is reconnected with the server system 114, the state reconciliation module 434 compares the predicted inputs (determined by simulation module 430) with the user's intended inputs (recovered after the disruption). Based on a result of the comparison (e.g., whether there is a difference, or a measure of an amount of the difference compared to a threshold), the state reconciliation module 434 reconciles the extant game state resulting from simulated game play (GS2) with the game state that would have pertained had the user maintained control (GS2a), resulting in a subsequent game state GS3.

The state reconciliation module 434 uses one or more methods to correct and/or modify the placeholder game state GS2 to more closely match the intended game state GS2a, depending on the particular game and/or the particular scenario. For example, if the user intended to move a character to a first area of a game scene but, during a disruption, the simulation moved the character to a second area different from the first, GS2 would depict the character in the second area (the predicted area), while GS2a would depict the character in the first area (the intended area). In some implementations, the state reconciliation module 434 would cause the game engine 428 to gradually or immediately shift the character to the first area. As such, the game engine 428 would output a subsequent game state GS3 depicting the character in the first area. For implementations where discrepancies between game states GS2 and GS2a are gradually corrected, the game engine 428 outputs successive game states GS3 depicting the character moving towards the intended area (e.g., rendered over a predetermined number of response frames or a predetermined amount of time); whereas, for implementations where discrepancies are immediately corrected, the game engine 428 outputs a game state GS3 immediately depicting the character at the intended area (e.g., rendered in the next response frame).

As discussed above with respect to FIG. 5C, from the user's perspective, the response frames depicting game state GS3 may appear to be inconsistent with the currently displayed game state GS2; however, they are consistent with the user's intent at the time the user initially transmitted the user input. Game developers may plan for these contingencies in advance by, for example, designing animations that reconcile inconsistent game states. Example reconciliation animations include immediately shifting a virtual character or object to an intended position as previously discussed (even if this may appear to violate the in-game physics), or advancing the game state in the intended manner without showing the correct animation (e.g., updating the score without showing the puck arrive at the goal, or classifying a monster as having sustained a wound even though the monster appeared to have moved out of the way before being shot). In some implementations, reconciling a current game state GS2 with an intended game state GS2a comprises modifying a frame depicting the current game state GS2 to create a subsequent frame depicting, or more closely matching, the intended game state GS2a.

Figure 8A:
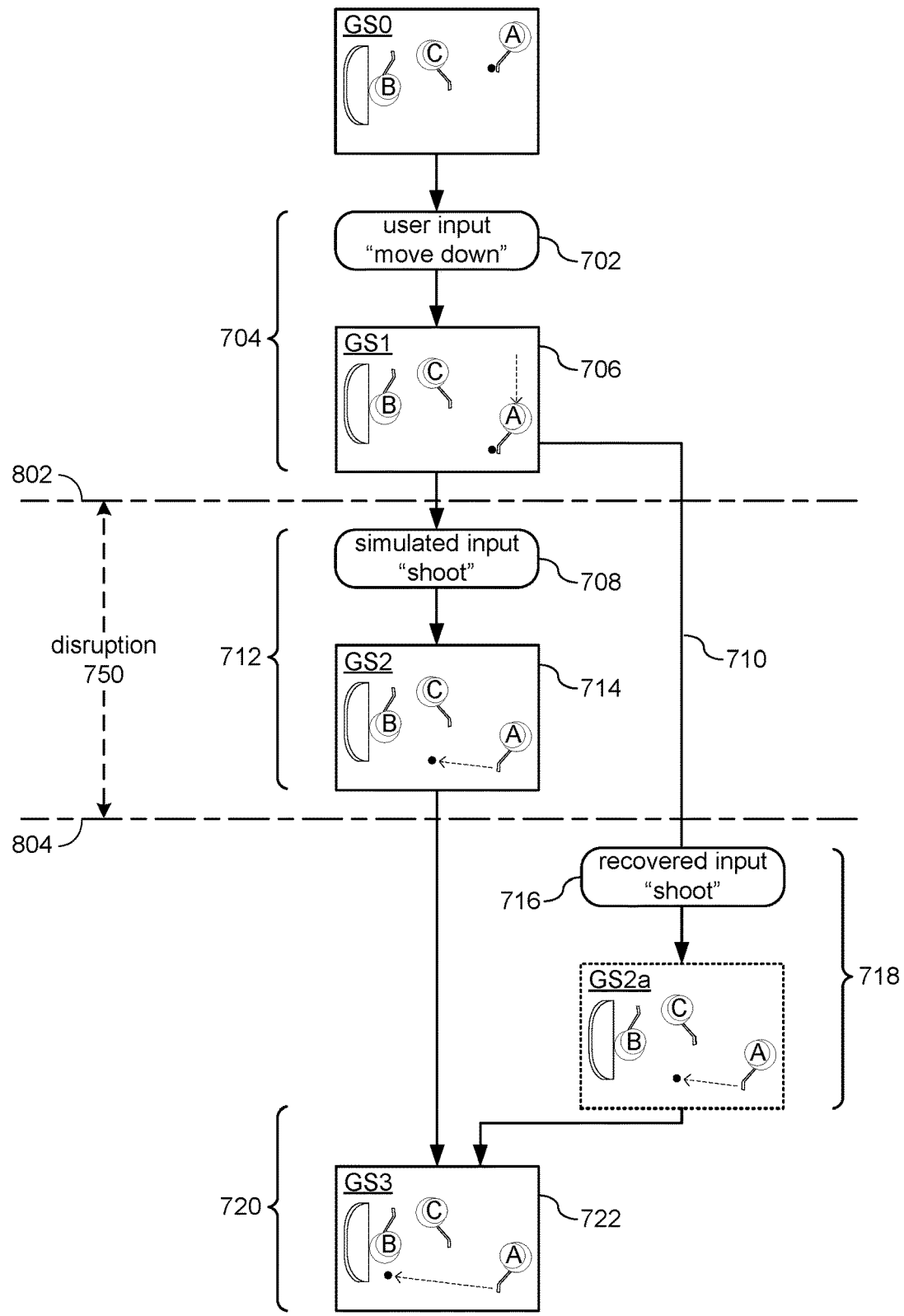
FIGS. 8A-8B illustrate example scenarios of a gameplay process in accordance with some implementations.
Figure 8B:
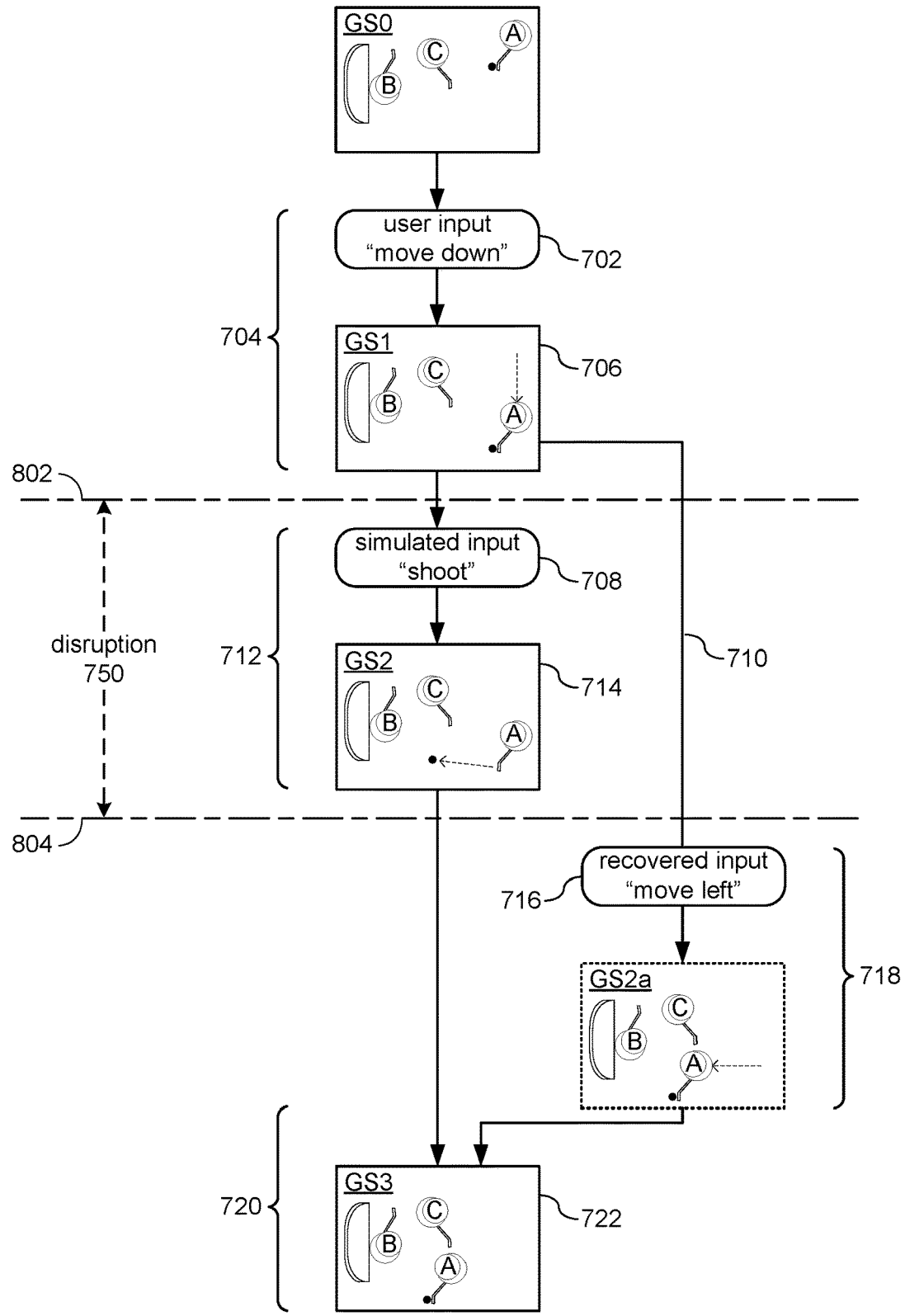

FIGS. 8A-8B illustrate two scenarios of an example gameplay process consistent with the disruption compensation method 700 discussed above. A disruption is depicted as starting at line 802, and ending at line 804. User inputs and game states corresponding with those in method 700 are similarly labeled. In both figures, the intended game state GS2a is bordered by a dashed line to signify that it is not displayed to the user; rather, the intended game state GS2a is generated merely as a basis for the comparison by the state reconciliation module 434 (step 720).

In scenario 810 (FIG. 8A), the simulation correctly predicts that in response to game state GS1, the user (Player A) would have shot the puck. In response to this prediction, the simulation module 430 sends a "shoot" input (708) to the game engine 428, which outputs a placeholder game state GS2, depicting the puck being shot. Since the placeholder game state GS2 and the intended game state GS2a are the same, the state reconciliation module 434 instructs the game engine 428 to continue generating updated game states based on the placeholder game state GS2. Alternatively, the state reconciliation module 434 instructs the game engine 428 to continue generating updated game states based on the intended game state GS2a. Accordingly, GS3 depicts the puck continuing on its path to the goal.

In scenario 820 (FIG. 8B), the simulation incorrectly predicts that in response to game state GS1, the user would have shot the puck. Instead, the user intended to move the player closer to the goal (see recovered input "move left"). Since the placeholder game state GS2 and the intended game state GS2a are different, the state reconciliation module 434 instructs the game engine 428 to modify the placeholder state GS2 to more closely match the intended state GS2a. As a result, the game engine outputs a subsequent game state GS3 showing the user (Player A), moving as intended.

From the user's perspective, and even from the perspective of other users (e.g., users playing the same game with other game controllers 102A, FIG. 1), the transition from GS2 to GS3 may seem disjointed, counterintuitive, or glitchy if not properly handled, or if enough time has passed that there is no smoother way to handle the discrepancy. In some implementations, to prevent this scenario, the state reconciliation module 434 foregoes modifying the placeholder game state GS2 after a predetermined amount of time has passed, or after a predetermined number of placeholder game states GS2 has been generated and rendered to other users (due to the game having advanced past a point of no return, despite the user's initial intent). For example, for games that cannot be paused, or for games with rapidly advancing game states, the reconciliation module 434 may forego reconciling placeholder states with intended states after (i) a predetermined time period (e.g., 2 seconds, 5 seconds, or the like), (ii) a predetermined number of game states, or (iii) a predetermined amount of difference between a placeholder state and an intended state, and/or (iv) a predetermined measure of inconsistency based on the number of other players that will be affected by the reconciliation, and/or how much of an affect to the gameplay the reconciliation would be.

In addition, in some implementations, in order to address or mitigate discrepancies like the one shown in FIG. 8B (between GS2 and GS3), the state reconciliation module 434 instructs the game engine 428 to include a notification with the subsequent game state GS3, notifying one or more affected users about the reason for the discrepancy. In some implementations, the state reconciliation module 434 causes a notification to be displayed to one or more users every time the disruption compensation step 720 is performed. Stated another way, the state reconciliation module 434 causes a notification to be displayed in order to inform the user(s) that a simulation temporarily took over a particular user's gameplay.

In addition, in some implementations, in order to address or mitigate discrepancies like the one shown in FIG. 8B (between GS2 and GS3), the state reconciliation module 434 instructs the game engine 428 to provide a rewind or do-over option for one or more of the players to select. Upon selection of this option, the game engine 428 would resort to a previous state (e.g., state GS1), allowing the user(s) to get a second chance to play the game as intended. In some implementations, the game server provides a gameplay rewind or do-over automatically (without requiring a user to select a rewind or do-over option).

Figure 9:
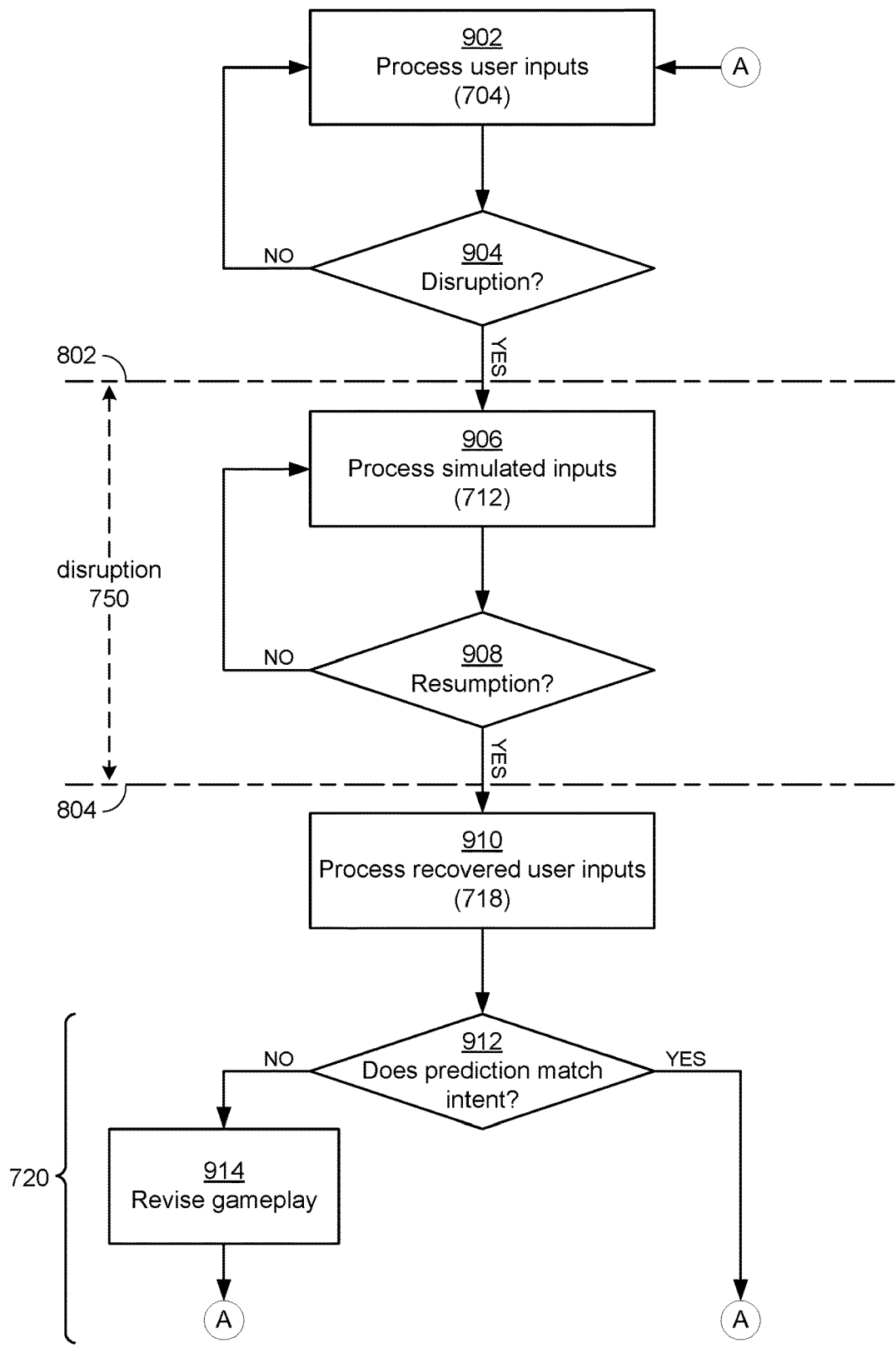
FIG. 9 is a flow diagram illustrating an example method for processing gameplay before, during, and after a disruption in accordance with some implementations.

FIG. 9 is a flow diagram illustrating an example method 900 for processing gameplay before, during, and after a disruption in accordance with some implementations. Method 900 corresponds with method 700 (FIGS. 7 and 8), with corresponding steps similarly labeled.

Method 900 is, optionally, governed by instructions that are stored in a computer memory or non-transitory computer readable storage medium (e.g., the game server module 426 in FIG. 4) and that are executed by one or more processors of the server system 114 (e.g., CPU 138 and/or GPU 140). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 900 may be combined and/or the order of some operations may be changed.

Method 900 is performed by the server system 114 including one or more processing cores (e.g., CPU 138 and/or GPU 140) and memory storing programs for execution by the processing cores. The server system 114 (e.g., game engine 428) processes (902) user inputs as in step 704 discussed above. While the game engine 428 processes user inputs, the disruption detection module 432 checks (904) for disruptions in the network connection with the controller 102. As long as there are no disruptions (904: NO), the game engine 428 continues to process user inputs. However, when there is a disruption (904: YES), the simulation module 430 simulates (906) user inputs in step 712 discussed above.

The disruption detection module 434 continues to check (908) the status of the network connection with the controller 102. If the disruption persists (908: NO), the simulation module 430 continues to simulate user inputs. In some implementations, the simulation module stops simulating user inputs after a predetermined amount of time (e.g., 2 seconds, 5 seconds, or the like). If the network connection is resumed (908: YES), the state reconciliation module 434 processes (910) recovered user inputs as in step 718 discussed above.

The state reconciliation module 434 compares (912): (i) the placeholder game state(s) resulting from the simulation's predictions concerning how the user would have played during the disruption, with (ii) the intended game state(s) resulting from the processing of the recovered inputs, as in step 720 discussed above. If the simulation's predictions match the user's intent (e.g., placeholder state GS2 and intended state GS2a match, or simulated input(s) and recovered input(s) match), then the process returns to step 902 in order to continue processing user inputs. However, if the simulation's predictions do not match the user's intent (e.g., placeholder state GS2 and intended state GS2a do not match, or simulated input(s) and recovered input(s) do not match), then the reconciliation module 434 revises gameplay (e.g., by modifying the placeholder state GS2a) as in step 720 discussed above, and the process then returns to step 902 in order to continue processing user inputs.

By compensating for network connection issues experienced by a particular user of a real-time interactive online game environment such as gaming environments 100 and 500, the implementations disclosed herein mitigate inherent network connection issues while making the user feel like the connection did not drop. The disclosed implementations make online gaming sessions more resilient to temporary connection drop outs by both learning the user's in-game behavior, and also accounting for errors in certain assumptions made based on the learned behavior. It is important to note that in some implementations of the online gaming environments disclosed herein, each user's output device (e.g., television, console, display) is rendering its own view of the game, while the processing of gameplay events takes place at a server system that is remote from the user. As such, even if there is a connection issue on the user's end (e.g., media device 106 or controller 102), gameplay processing still continues at the server system 114 for the rest of the players of the game. Therefore, the various implementations disclosed herein allow a user affected by a connection issue to continue playing the game, therefore have a seamless and positive gameplay experience.

Additional Simulation Features

Referring back to the discussion regarding the simulation module 430 and gameplay behavior profiles 458 above, the following discussion discloses additional features related to the AI-enabled simulation features in the context of online gaming in accordance with some implementations.

In some implementations, a particular user's gameplay behavior profile 458 serves as the basis for a simulation module 430 to play the game on behalf of the user indefinitely, or until the user decides to turn off the simulation. In some implementations, the simulated version of a user's character (e.g., the virtual character and all of the gameplay inputs that control the character) populates the game worlds of other users. Stated another way, other users may interact with the simulated version of a particular user's character on their own respective gaming components (e.g., controllers 102, media devices 106, and/or output devices 108).

In some implementations, the simulated version of a particular user's character populates the game world of the particular user, allowing the particular user to interact (using another character) with the simulated character. These implementations allow the user to be exposed to the user's own simulation. For example, these implementations allow the user to play (i) against a simulation that has been trained to play exactly like the user, or (ii) with a simulation that has been trained to play exactly like the user. For implementations in which the user can play against the simulation, this allows the user to further train the simulation since the simulation constantly learns from the user's active gameplay control as discussed above. For implementations in which the user can play with the simulation, this allows the user to team up with one or more simulated players that have been trained to play with the user's skills, which would be useful in team games such as sports and role playing games in which teams of characters can work together to accomplish tasks.

Notes Regarding the Disclosure

Reference have been made in detail to various implementations, examples of which are illustrated in the accompanying drawings. In the above detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

It will be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, without changing the meaning of the description, so long as all occurrences of the first device are renamed consistently and all occurrences of the second device are renamed consistently. The first device and the second device are both device, but they are not the same device.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of processing gameplay inputs during and after network disruptions, the method comprising:
   at a server system having one or more processors and memory storing one or more programs for execution by the one or more processors:
   determining, during a disruption in a network connection between the server system and a first client device, a simulated gameplay input for the first client device;

updating a first game state based on the simulated gameplay input, resulting in a placeholder game state;

receiving, upon resumption of the network connection, a recovered gameplay input made by a user of the first client device during the disruption;

updating the first game state based on the recovered gameplay input, resulting in an intended game state;

comparing the placeholder game state to the intended game state;

updating the placeholder game state based on the comparison of the placeholder game state to the intended game state, resulting in a subsequent game state; and transmitting a frame depicting the subsequent game state to an output device associated with the first client device.

2. The method of claim 1, wherein comparing the placeholder game state to the intended game state comprises determining whether there is a difference between the placeholder game state and the intended game state; and wherein updating the placeholder game state comprises:
in accordance with a determination that there is a difference between the placeholder game state and the intended game state, modifying the placeholder game state to match the intended game state.

3. The method of claim 2, wherein updating the placeholder game state further comprises:
in accordance with a determination that there is no difference between the placeholder game state and the intended game state, foregoing consideration of the intended game state.

4. The method of claim 1, further comprising:
prior to the disruption, simulating in-game behavior of a user of the first client device in accordance with a plurality of gameplay inputs received by the first client device; and
during the disruption, determining the simulated gameplay input for the first client device based on the simulated in-game behavior of the user of the first client device.

5. The method of claim 4, wherein simulating in-game behavior of the user of the first client device comprises:
receiving a plurality of gameplay inputs from the first client device;
tracking each of the plurality of gameplay inputs and corresponding trigger states, wherein a respective trigger state is a game state that triggers a respective gameplay input;
building a gameplay profile of the user of the first client device based on the plurality of gameplay inputs and corresponding trigger states;
determining a predicted gameplay input based on the gameplay profile of the user of the first client device;
receiving a subsequent gameplay input from the first client device;
comparing the subsequent gameplay input to the predicted gameplay input; and
adjusting the gameplay profile based on the comparison of the subsequent gameplay input to the predicted gameplay input.

6. The method of claim 5, further comprising:
determining, for a plurality of successive game states, predicted gameplay inputs for the user of the first client device based on the gameplay profile;
receiving, for the plurality of successive game states, gameplay inputs from the user of the first client device;
comparing the predicted gameplay inputs with corresponding gameplay inputs received from the user of the first client device; and
adjusting the gameplay profile based on the comparing.

7. The method of claim 1, wherein determining a simulated gameplay input comprises:
prior to and during the disruption, executing at the server a gameplay simulation associated with a user of the first client device, wherein the gameplay simulation is running in parallel with a gaming session supported by the network connection;
upon detection of the disruption in the network connection, switching from an active gameplay mode to a simulated gameplay mode, wherein:
during the active gameplay mode, a gaming engine associated with the gaming session receives gameplay inputs from the first client device, and
during the simulated gameplay mode, the gaming engine receives gameplay inputs from the gameplay simulation.

8. The method of claim 1, wherein the placeholder game state is a first updated version of the first game state, and the intended game state is a second updated version of the first game state derived independently of the first updated version of the first game state.

9. The method of claim 1, further comprising:
after updating the first game state based on the simulated gameplay input, resulting in a placeholder game state: transmitting a frame depicting the placeholder game state to an output device associated with a second client device; and
after updating the placeholder game state based on the comparison of the placeholder game state to the intended game state, resulting in a subsequent game state: transmitting a frame depicting the subsequent game state to the output device associated with the second client device.

10. The method of claim 1, further comprising:
transmitting, upon resumption of the network connection, a notification to the first client device notifying a user of the first client device that a simulated gameplay input for the first client device influenced gameplay during the disruption in the network connection.

11. The method of claim 1, further comprising:
transmitting, upon reaching a predetermined threshold of time after an initial detection of the disruption, a notification to the first client device notifying a user of the first client device that a simulated gameplay input for the first client device is influencing gameplay.

12. A method of processing gameplay inputs during and after network disruptions, the method comprising:
at a server system having one or more processors and memory storing one or more programs for execution by the one or more processors:
determining, during a disruption in a network connection between the server system and a first client device, one or more simulated gameplay inputs for the first client device;
controlling a gameplay process in accordance with the one or more simulated gameplay inputs for the first client device;
receiving, upon resumption of the network connection, one or more recovered gameplay inputs made by a user of the first client device during the disruption;

determining a length of the disruption at a time proximate to the receiving of the one or more recovered gameplay inputs;
in accordance with a determination that the length of the disruption is less than a predetermined threshold:
  determining an intended game state based on (i) the one or more recovered gameplay inputs, and (ii) a game state that existed at a time proximate to the detecting of the disruption;
  comparing a current game state to the intended game state;
  updating the current game state based on the comparison of the current game state to the intended game state; and
  transmitting a frame depicting the updated current game state to an output device associated with the first client device.

13. The method of claim 12, further comprising:
in accordance with a determination that the length of the disruption is greater than or equal to the predetermined threshold;
  disregarding the one or more recovered gameplay inputs; and
  notifying a user of the first client device that the one or more recovered gameplay inputs were disregarded.

14. An electronic server system, comprising:
one or more processors; and
memory storing one or more programs for execution by the one or more processors, the one or more programs comprising instructions for:
  determining, during a disruption in a network connection between the server system and a first client device, a simulated gameplay input for the first client device;
  updating a first game state based on the simulated gameplay input, resulting in a placeholder game state;
  receiving, upon resumption of the network connection, a recovered gameplay input made by a user of the first client device during the disruption;
  updating the first game state based on the recovered gameplay input, resulting in an intended game state;
  comparing the placeholder game state to the intended game state;
  updating the placeholder game state based on the comparison of the placeholder game state to the intended game state, resulting in a subsequent game state; and
  transmitting a frame depicting the subsequent game state to an output device associated with the first client device.

* * * * *